US012669421B2

(12) United States Patent
Deng et al.

(10) Patent No.: US 12,669,421 B2
(45) **Date of Patent: *Jun. 30, 2026**

(54) TENSILE ACOUSTIC RHEOMETRY FOR CHARACTERIZATION OF VISCOELASTIC MATERIALS

(71) Applicant: REGENTS OF THE UNIVERSITY OF MICHIGAN, Ann Arbor, MI (US)

(72) Inventors: Cheri X. Deng, Ann Arbor, MI (US); Jan P. Stegemann, Ann Arbor, MI (US); Weiping Li, Ann Arbor, MI (US); Eric C. Hobson, Ann Arbor, MI (US)

(73) Assignee: REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 308 days.

This patent is subject to a terminal disclaimer.

(21) Appl. No.: 18/386,813

(22) Filed: Nov. 3, 2023

(65) Prior Publication Data

US 2024/0151622 A1     May 9, 2024

Related U.S. Application Data

(60) Provisional application No. 63/423,329, filed on Nov. 7, 2022.

(51) Int. Cl.
*G01N 11/00*            (2006.01)
(52) U.S. Cl.
CPC ...... *G01N 11/00* (2013.01); *G01N 2011/0073* (2013.01)
(58) Field of Classification Search
CPC ....................................................... G01N 11/00
See application file for complete search history.

(56) References Cited

U.S. PATENT DOCUMENTS 6,596,239 B2     7/2003   Williams et al.
6,925,856 B1     8/2005   Williams
(Continued)

OTHER PUBLICATIONS

Corey et al., Sonic Estimation of Elasticity via Resonance: A New Method of Assessing Hemostasis, Ann. Biomed. Eng., 44(5):1405-1424 (2016).

(Continued)

*Primary Examiner* — Kristina M Deherrera
*Assistant Examiner* — Jean F Morello
(74) *Attorney, Agent, or Firm* — MARSHALL, GERSTEIN & BORUN LLP

(57) ABSTRACT

A new acoustic technique, tensile acoustic rheometry (TAR) for performing rheology measurement of a soft viscoelastic material sample is provided. In TAR, an excitation acoustic pulse is applied using a focused ultrasound transducer to a sample material to induce oscillatory motion of the sample. To track this induced motion, high repetition frequency ultrasound pulse-echo technique is used using a co-linear, con-focal ultrasound transducer that detects the backscattered echo signal from a surface or an interface of the sample. The detection ultrasound transducer system converts the echo signals to an electrical signal, and a processor determines a displacement of the interface of the sample as a function of time. The processor also determines the spectrogram, or the frequency spectrum of the dynamic surface movement of the sample material as a function of the time. Viscoelastic properties of the material are then determined from the displacement and the spectrogram measurements.

22 Claims, 14 Drawing Sheets
(6 of 14 Drawing Sheet(s) Filed in Color)

(56)                    References Cited

U.S. PATENT DOCUMENTS

| | | |
|---|---|---|
| 6,951,544 B2 | 10/2005 | Trahey et al. |
| 9,031,701 B2 | 5/2015 | Viola et al. |
| 9,272,280 B2 | 3/2016 | Viola et al. |
| 9,494,475 B2 | 11/2016 | Hadj Henni et al. |
| 9,585,631 B2 * | 3/2017 | Vappou .................. A61B 8/485 |
| 9,726,647 B2 | 8/2017 | Walker et al. |
| 2010/0016718 A1 | 1/2010 | Fan et al. |
| 2010/0069751 A1 | 3/2010 | Hazard et al. |
| 2010/0125199 A1 | 5/2010 | Joo et al. |
| 2016/0274015 A1 | 9/2016 | Hadj Henni et al. |
| 2017/0367683 A1 | 12/2017 | Zheng et al. |

OTHER PUBLICATIONS

Ferrante et al., A Novel Device for the Evaluation of Hemostatic Function in Critical Care Settings, Anesth. Analg., 123(6):1372-79 (2016).

Hobson et al., Resonant acoustic rheometry for non-contact characterization of viscoelastic biomaterials, Biomat., 269:120676 (2021).

Krebs et al., A portable blood plasma clot micro-elastometry device based on resonant acoustic spectroscopy, Rev. Sci. Instrum., 86(7):075005 (2015).

Li et al., Resonant Acoustic Rheometry to Measure Coagulation Kinetics in Hemophilia A and Healthy Plasma: A Novel Viscoelastic Method, Semin. Thromb. Hemost., 49(02): 201-208 (2023).

Nightingale, Acoustic Radiation Force Impulse (ARFI) Imaging: a Review, Curr. Med. Imaging Rev., 7(4):328-339 (2012).

Oyen, Mechanical characterization of hydrogel materials, Int. Mater. Rev., 59(1):44-59 (2014).

* cited by examiner

300

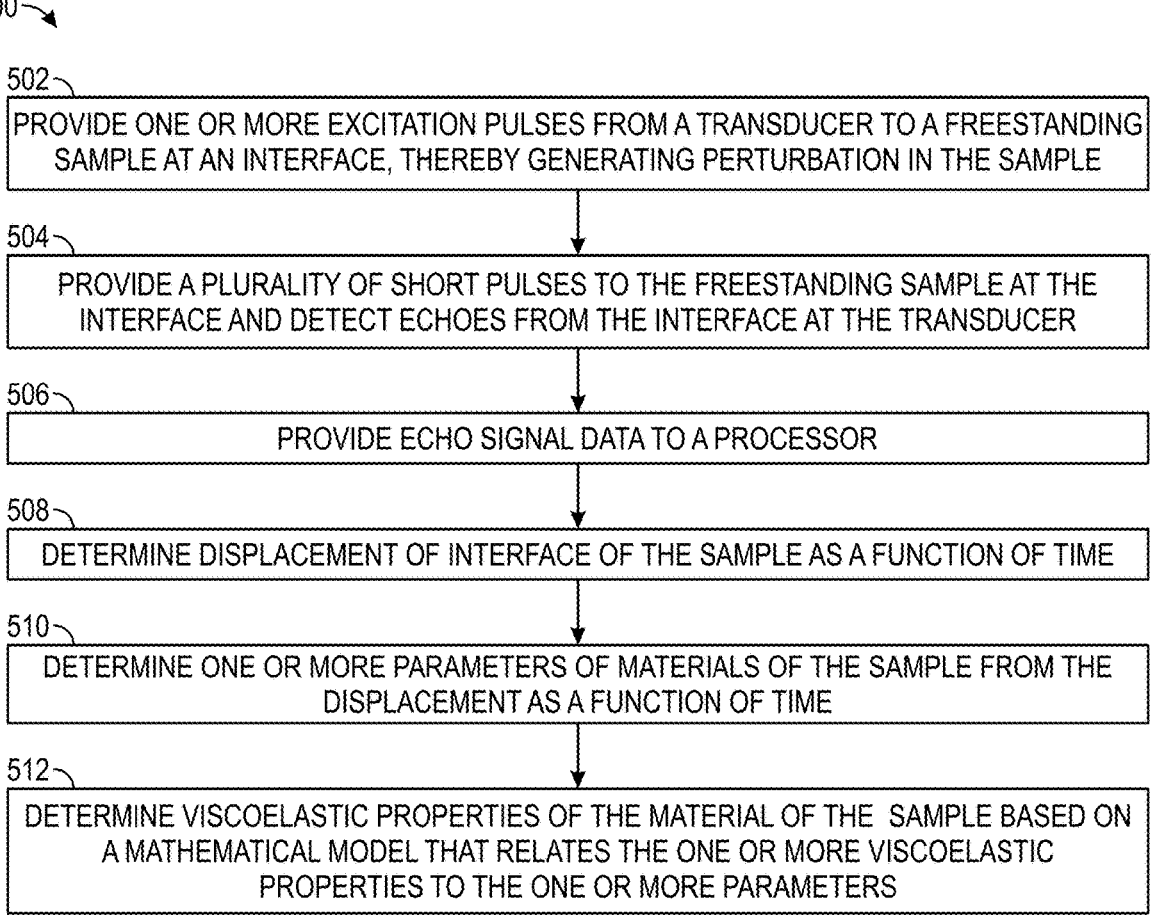

500

502
PROVIDE ONE OR MORE EXCITATION PULSES FROM A TRANSDUCER TO A FREESTANDING SAMPLE AT AN INTERFACE, THEREBY GENERATING PERTURBATION IN THE SAMPLE

504
PROVIDE A PLURALITY OF SHORT PULSES TO THE FREESTANDING SAMPLE AT THE INTERFACE AND DETECT ECHOES FROM THE INTERFACE AT THE TRANSDUCER

506
PROVIDE ECHO SIGNAL DATA TO A PROCESSOR

508
DETERMINE DISPLACEMENT OF INTERFACE OF THE SAMPLE AS A FUNCTION OF TIME

510
DETERMINE ONE OR MORE PARAMETERS OF MATERIALS OF THE SAMPLE FROM THE DISPLACEMENT AS A FUNCTION OF TIME

512
DETERMINE VISCOELASTIC PROPERTIES OF THE MATERIAL OF THE SAMPLE BASED ON A MATHEMATICAL MODEL THAT RELATES THE ONE OR MORE VISCOELASTIC PROPERTIES TO THE ONE OR MORE PARAMETERS

E=10kPa, Nu=0.495

TENSILE ACOUSTIC RHEOMETRY FOR CHARACTERIZATION OF VISCOELASTIC MATERIALS

CROSS-REFERENCE TO RELATED APPLICATIONS

This application claims priority to and the benefit of the filing date of provisional U.S. Patent Application No. 63/423,329 entitled "TENSILE ACOUSTIC RHEOMETRY FOR CHARACTERIZATION OF VISCOELASTIC MATERIALS," filed on Nov. 7, 2022. The entire contents of the provisional application are hereby expressly incorporated herein by reference.

GOVERNMENT LICENSE RIGHTS

This invention was made with government support under DE026630 awarded by the National Institutes of Health (NIH). The government has certain rights in the invention.

FIELD OF THE INVENTION

The disclosure relates generally to methods for measuring viscoelastic properties of materials longitudinally in contactless fashion, and more particularly for utilizing ultrasound for generating and tracking surface or interfacial oscillations of soft materials to quantify viscoelastic properties of these materials.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

The mechanical characterization of soft biomaterials, tissues and other hydrated materials is important for basic scientific research, engineering applications, clinical diagnostics, and a variety of applications in other industries. Compared to the testing of metals or stiff materials, mechanical quantification of soft viscoelastic materials can be particularly challenging due to their relatively low elastic modulus, time-dependent mechanical response, and biphasic structure. Conventional material testing approaches used for soft materials, including tension, compression, indentation, and shear-based methods, are contact based. These techniques are generally unable to track changes in material properties of a sample longitudinally due to the potential for sample contamination and damage resulting from direct contact with a material as well as the slow speed of measurements. There is a need of appropriate techniques for mechanical characterization of materials that are not always static, can undergo significant viscoelastic changes over a variety of time scales, and are required to be kept in sterile condition. The importance of quantitative assessment of soft materials has been recognized in a wide range of fields including tissue engineering, regenerative medicine, bioprinting, cosmetics, agriculture, and food sciences.

A possible application of TAR is the assessment of mechanical properties of resected tissues from biopsy, i.e., skin punctures or resected lymph nodes. Information from such measurements may provide standards to be used for in vivo characterization of such tissues using MRI elastography or ultrasound elastography.

Ultrasonic pulses can penetrate and propagate in both solid and liquid mediums, and the scattering or reflection by local inhomogeneity and variation in acoustic impedance along the line of sight may be used to determine the location and properties of the scatterers based on the time of travel of the ultrasound backscattered signal.

A variety of non-contact testing modalities have been exploited using optical, acoustic, or magnetic forces. Ultrasound approaches offer an advantageous strategy for mechanical measurement due to the potential of non-contact measurements. Ultrasound elastography is an ultrasound imaging modality that detects spatial variation in tissue stiffness based on the difference in internal deformation upon externally applied mechanical compression. These deformations or strains are determined from the temporal shifts of backscattered signals, which correspond to the locations of internal targets before and after the applied compression. A modification of this technique, Acoustic radiation force impulse (ARFI) imaging, utilizes acoustic radiation force (ARF) to generate tissue deformation in place of external palpation using direct physical compression or vibration.

Ultrasound elastography provides an external palpitation to a tissue or region under examination and then measures strain of the tissue using ultrasound imaging detection. A 2D strain map can be generated for the tissues, allowing for the qualitative measurement of spatial stiffness heterogeneity, where higher local strains indicate a region of lower stiffness and vice versa. While this approach can detect stiffness heterogeneity in a tissue, it generally cannot provide absolute quantitative measures of the intrinsic properties of a material because the stress field cannot generally be predicted in a complex spatial environment.

In another example, shear-wave elastography imaging (SWEI) utilizes a high intensity ultrasonic pulse to generate acoustic radiation forces within a tissue that induce shear waves that propagate transversely with regard to the ultrasound pulse direction within the bulk of the tissues. The propagation of the shear waves may be detected using ultrasound imaging to determine the velocity of the shear waves, which may be used to calculate the elasticity of the tissue.

While such ultrasound elastography modalities may provide a convenient method for detect mechanical inhomogeneity of tissue in vivo, they are not well suited for the actuate characterization of small biomaterial samples in vitro. Further, each technique has limitations in spatial and temporal resolution as well as the types of materials that may be analyzed. Thus, there is a need for techniques capable of accurately measuring elastic and stiffness properties of a broad range of materials with high throughput and temporal resolution.

SUMMARY OF THE INVENTION

The present application describes techniques and systems, termed as tensile acoustic rheometry (TAR), for mechanical characterization of materials and can overcome the limitations of conventional techniques. In particular, rather than measuring deformations within the bulk of a material to estimate elasticity as in ultrasound elastography, the present techniques utilize free oscillatory movement of a non-constrained sample induced by a short, focused ultrasound pulse. TAR detects the oscillatory motion of the sample via the dynamic movement of the surface or an interface within the materials, which represents a compression/tensile movement of the material. The detected frequency and damping characteristics of the oscillation are then used to determine the viscoelastic property of the material.

The present techniques provide substantial improvements over techniques such as Sonic Estimation of Elasticity via Resonance (SEER) in terms of sensitivity and flexibility. In SEER, resonant shear waves within the bulk of material generated by the acoustic radiation force (ARF) are used to measure viscoelastic properties of clotting blood housed in a proprietary cartridge system. Ultrasonic tracking of shear waves in techniques such SEER or other elastographic techniques requires the presence of acoustic scattering elements within the samples (like blood cells), thus these techniques are not suitable for materials without detectable acoustic scatters such as hydrogels or other homogeneous materials with no or low concentrations of scatterers. In contrast, TAR detects the sample oscillation via the surface movement of a sample, which provides high sensitivity and high signal to noise ratio due to the air/material interface, without relying on the internal scatterers.

While resonant acoustic rheometry (RAR) is particularly applicable to liquid samples and samples transitioning from liquid to solid, the present TAR techniques complement RAR because TAR techniques provide robust measurements of solid samples without the requirement of a sample holder with an axis symmetric geometry, but have the same advantages as RAR for non-contact and rapid measurements.

The present techniques use a model of a damped harmonic oscillator including a spring and mass to describe the behavior of the oscillations of the viscoelastic solid sample. By measuring the oscillation frequency of the sample and damping coefficient, the present techniques determine the viscoelasticity of the material, overcoming the disadvantages of requiring a large surface area or a particular shape of material to be measured. Further, the present techniques allow for the determination of viscoelastic parameters from measurements obtained from small sample volumes with small surface area.

TAR provides techniques for rheology measurement of a sample material of small volume and without strict requirement on the surface area/shape and the need of a sample holder. In particular, the present techniques may include: (i) providing, by a first ultrasound transducer, an excitation tone burst of short duration to a freestanding sample, the excitation tone burst being focused at an interface of the freestanding sample and inducing a tensile perturbation in the freestanding sample, the perturbation being characterized by an initial deformation or displacement of the interface followed by free oscillatory motion of the freestanding sample; (ii) providing, by a second ultrasound transducer, a plurality of short pulses to the freestanding sample at the interface, the plurality of pulses being synchronized, in time, to impinge upon the interface after the excitation tone burst, to receive, from the interface, echoes responsive to the initial displacement and the following oscillatory motion of the freestanding sample; (iii) detecting, by the second ultrasound transducer, the echoes and providing electrical signals indicative of the detected echoes to one or more processors; (iv) determining, by the one or more processors, a displacement as a function of time of the interface from the detected echoes; (v) determining, by the one or more processors, a frequency spectrum of the free oscillatory motion of the freestanding sample from the displacement as a function of time of the interface; and (vi) determining, by the one or more processors, one or more viscoelastic properties of the freestanding sample, based on a mathematical model that relates the one or more viscoelastic properties of the freestanding sample with a measured oscillation frequency and a damping of the freestanding sample, which are determined from the displacement as a function of time of the interface.

In these ways, the present techniques provide an approach for contactless, non-invasive rheology measurements on soft biomaterials and other samples. The techniques can be used for measuring properties of a wide variety of sample materials, and take only a fraction of a second to perform a measurement, with the capability to repeatedly apply with high temporal resolution to capture the changes in material mechanical properties of the same sample longitudinally over a wide range of time scales from min, hours, or days. A number of key aspects demonstrate the novelty of the techniques herein where one or more of these aspects are unique in comparison to any from prior methodologies, including the use of acoustics for generation and detections of oscillations, the utilization of tensile oscillation frequencies of a free standing sample for material characterization, the estimation of material elasticity and viscoelastic properties, and the capability to track dynamic changes in material viscoelasticity at a variety of time scales.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 4 is a flow diagram of a method for performing or characterizing viscoelastic materials using tensile acoustic rheometry on a sample material, in accordance with an example.

DETAILED DESCRIPTION

Figure 1:
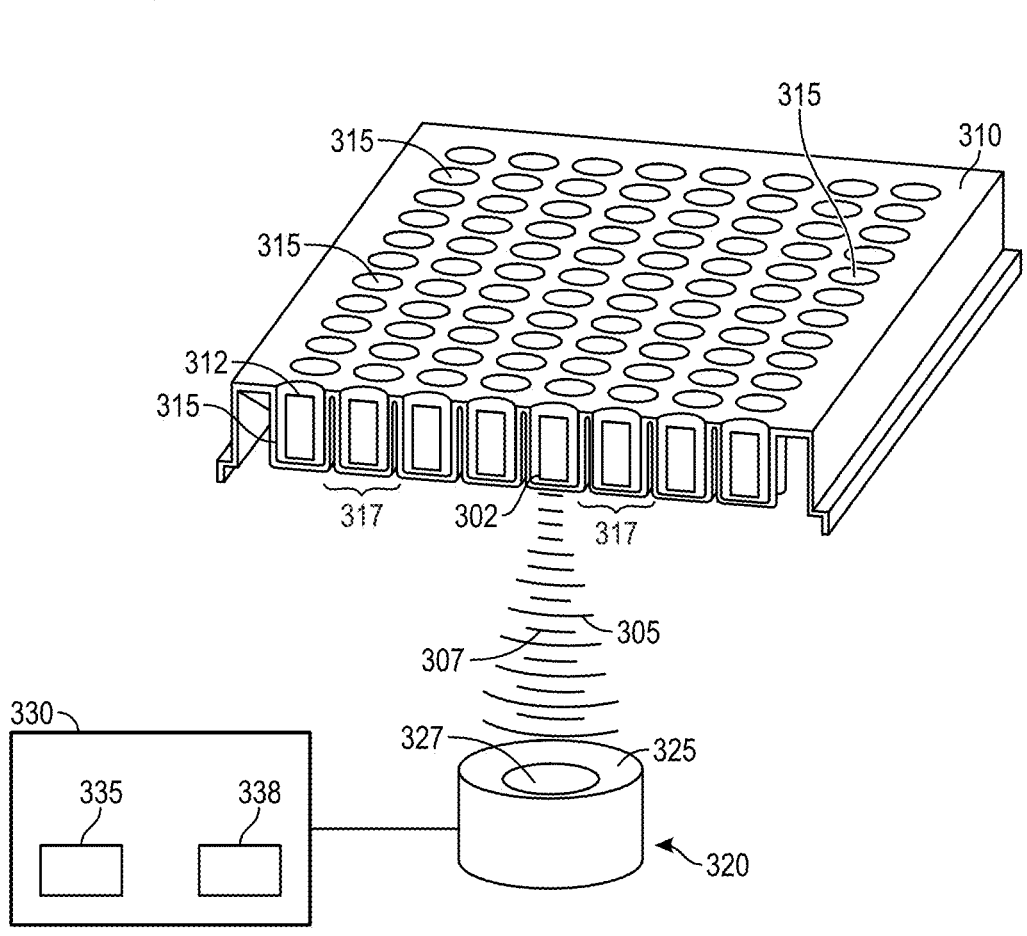
FIG. 1 illustrates a schematic of an example system for characterizing viscoelastic materials using tensile acoustic rheometry using dual transducers aligned underneath a well microplate, in accordance with an example.

The present application provides techniques for performing viscoelastic measurements of freestanding materials, such as semisolid, solid, and/or gelatinous materials. In particular, the technique utilizes ultrasound to both generate and track oscillation(s) of freestanding materials to determine the elasticity, viscosity, and/or similar viscoelastic characteristics of a material. While the described methods may be implemented in a variety of medical and research applications, it should be appreciated that the disclosed technologies may be applied in any other fields for measuring viscoelasticity, stiffness, surface oscillations, surface displacement, or other acoustic or mechanical properties of materials in any field, including the agriculture industry, cosmetics industry, food industry, and/or any similar industry in which soft hydrated materials may be used.

The disclosed systems and methods provide a means for characterizing tensile properties by acoustically generating and quantifying tensile oscillations. In various examples, the system includes a transducer that generates ultrasonic pulses, a transducer that detects and tracks resulting oscillations, and the processing system for calculating the viscoelastic properties of the freestanding material. These systems and methods enable the ability to rapidly and precisely quantify the viscoelasticity of the sample material both at a single time-point and as it changes over time. The disclosed technologies are effective at performing measurements of a wide range of freestanding materials with broad ranges of mechanical properties, including elasticity, stiffness, and viscous behavior. In various examples, systems herein may have a cheaper, more robust, and/or more streamlined design, as compared to other elastography technologies, that allows for coupling with external measurement methods and that enables cost- and time-savings in operation, and thus in research, industry, and medical diagnostics applications.

The described systems and methods include the generation and tracking of oscillations in freestanding materials. As used herein, "freestanding materials" may be a solid, a semisolid, a gelatinous substance, or any other such material substance that exhibits bulk oscillations in response to an acoustic radiation force impulse (ARF) perturbation. Depending on the implementation, the freestanding material includes skin samples, cancer biopsies, gelatins, samples of cosmetics, samples of food, etc. Also described are analytical methods to extract relevant viscoelastic material properties from the resonant oscillatory behavior of a material. The described approach is non-invasive, non-contact, and non-destructive, allowing for dynamic tracking of material properties at a variety of time scales (e.g., on the order of a second, or fractions of a second), which is not offered by other elastography methods. By being non-contact, the disclosed methods reduce risks of contamination or damage of materials, tissues, or samples and enables longitudinal tracking and quality control. Depending on the implementation, the freestanding sample being measured may include connective tissue, muscle tissue, epithelial tissue, nervous tissue, food, cosmetics, etc. Further, the described system does not require specialized labware, which makes the system more flexible to be combined with a wide variety of laboratory workflows.

FIG. 1 illustrates an example tensile acoustic rheometry (TAR) system 300 for implementing the methods and processes described and illustrated herein. The tensile acoustic rheometry system 300 includes a well plate 310 having wells 315 and a transducer device 320 physically positioned and configured to provide acoustic energy to the wells 315. The wells 315 contain a sample 302 of the freestanding material. The well 315 may further be referred to as a "chamber" herein. The sample 302 may include a gel, semisolid, solid, or other such freestanding material for performing measurements as provided in the methods and processes described herein. The sample 302 may include one or more proteins, polysaccharides, or other materials. The disclosed methods may be performed on samples 302 of less than 50 mm³ of material, between 50 and 100 mm³ of material, between 100 mm³ and 500 mm³ of material, etc. Further, the described methods may be useful for performing measurements and analysis of any interface of two surfaces such as an interface of the sample 302 with air, or the sample 302 with a semisolid and/or solid.

A pushing transducer 325 provides an external force in the form of acoustic pulses 305 to the sample 302. In various examples, the acoustic pulse 305 is a tone burst, i.e., a sinusoidal burst with a high pressure amplitude and duration relative to the second acoustic pulses 307. In some implementations, the tone burst has a short duration (e.g., <100 µs). In further implementations, the sample 302 has a surface 312 at the focus of the applied acoustic pulses 305. In other implementations, the surface 312 of the sample 302 is not the focus of the applied acoustic pulses, and instead the focus is in a bulk of the sample 302. The sample 302 undergoes a deformation (such as a deformation of the surface 312) in the direction of the ultrasonic waves and generates oscillatory motion of the freestanding sample 302. In some implementations, the oscillatory motion includes oscillatory movement akin to a mass on a spring of a point located along the surface of the sample 302. In further implementations, the bottom surface (e.g., the surface in contact with the bottom of the well and/or the transducer) remains stable while the remainder of the sample 302 oscillates freely. The surface 312, which is an interface of the sample in the illustrated example, in some examples, may be coated for example using surface coatings. Example surface coatings include plasma treatment (tissue culture treatment), silanization, siliconization, fluorosiliconization, pegylation, and petrolatum coating. For solid materials, surface roughness at the interface may be altered, for example, through etching to increase roughness or polishing or coating to reduce roughness.

A tracking transducer 327 provides confocal and coaxial ultrasonic pulses 307 in a pulse-echo mode to track the motion of the sample 302 and/or the surface 312. The second acoustic pulses 307 reflect off of the oscillating surface 312 of the sample 302 generating echoes 337 indicative of the motion of the sample 302. The tracking transducer 327 generates an electrical signal indicative of the detected pulses. The electrical signal may then be provided to a processor 330 for processing the signal and determining a displacement of the point in the sample 302 and/or on the measured surface 312 over time, i.e., displacement of the interface as a function of time. The displacement of the point may include determining parameters of an oscillatory response of the sample 302, including without limitation a natural frequency, maximum strain, and/or damping coefficient of the sample 302. Each of the parameters of the oscillatory response may depend on a size (e.g., thickness) of the sample 302 and a material composition of the sample 302. Further analysis of the oscillatory response of the sample 302 may be used to determine viscoelastic properties and other material properties, such as (i) natural frequencies, (ii) maximum strains, (iii) an elastic modulus, (iv) a shear modulus, (v) a Young's modulus, (vi) a kinematic viscosity, (vii) a shear viscosity, (viii) an interface energy, (ix) damping coefficients corresponding to various modes of oscillation, and/or (x) other such properties as further described in reference to the method and system described herein.

As illustrated in the cutaway drawing, in an example, the well plate 310 has 96 individual wells 315 each with an equal, or substantially equal, well width 317. In other examples, the well plate 310 may have 1 well, 5 wells, 50 wells 100 wells, or another number of wells. Additionally, the wells 315 may have varying well widths 317, and/or well shapes. Further, the well may have a tunable height (Z-axis), width (X-axis), depth (Y-axis), or diameter for tuning supported resonances of standing waves inside of the well 317. For example, the diameter of the well may be different at base of well, at the sample interface, and/or at the top of well. In some examples, the material surface of the well is consistent throughout. In some examples, the material surface of the well may change. Example material surfaces include polystyrene, polypropylene, glass, acrylic (PMMA), or silicone (PDMS). In some implementations, because the sample is freestanding, the shape and size of the well 315 does not affect the oscillation of the freestanding sample 302. In some such implementations, the freestanding sample 302 rests on a flat surface, such as a plate, rather than in a well 310.

The transducer device 320 has a dual transducer configuration having the pushing transducer 325 and the tracking transducer 327. The pushing and tracking transducers 325 and 327 may both be part of the single transducer device 320, as shown, while in other examples, the transducers 325 and 327 may be independent transducers that are positioned independently relative to the well plate 310 to provide acoustic energy to the wells 315.

The system 300 of FIG. 1 was constructed with the well plate 310 having 96 wells 315. The transducer device 320 was a circular two-element transducer with the pushing transducer 325 positioned around an outer radius of the transducer device 320, and the tracking transducer 327 is positioned at a central portion of the circular transducer device 320. Both the pushing transducer 325 and the tracking transducer 327 had a spherical focus, with the transducer device 320 aligned such that the foci of both the transducers 325 and 327 was at a position at about the center of the solution surface 312 to induce a force at the air-sample surface interface. In further implementations, the transducers 325 and 327 induce a force elsewhere in the sample besides the surface interface (e.g., in the center of the sample, at a location partway through the sample, etc.) The transducer device 320 was physically coupled to a 3D motion platform as the motion actuator 332 that allowed for automated control of the position of the transducer device 320. Therefore, the transducer device 320 could be moved and aligned to provide excitation pulses 305 to any sample 302 in any of the wells 315.

The transducer device 320 may be physically coupled to a translation stage 332 that controls a position of the transducer device 320. The translation stage 332 may be a three-dimensional (3D) translation stage that can move the transducer in an X, Y, and Z axis direction to position the transducer device 320 relative to the well plate 310 to provide the pushing and tracking pulses 305 and 307 to a well 315 of the well plate 310. In some implementations, the plates 310 are not in contact with the transducer device 320 and can quickly and easily be swapped out to enable rapid testing of hundreds or thousands of samples. In examples, the transducer device 320 may have a focal position for the acoustic pulses of between 0.5 and 2 inches from a center of the transducer device (i.e., each of the pushing and tracking transducers 325 and 327 have a focal point between 0.5 and 2 inches). In examples, the transducer device 320, and transducers thereof, may have focal points of between 0.1 inches and 1 inch, 1 and 2 inches, 2 and 5 inches, 5 and 10 inches, or between 1 and 12 inches. While described as a 3D translation stage, the translation stage (not shown) may include one or more of a single axis translation stage, two-axis translation stage, an actuator, a motor, or another element for controlling the position of the transducer device 320 relative to the well plate 310. Further, in examples, the transducer device 320 may be stationary and the position of the well plate 310 may be controlled and moved to position the wells 315 relative to the transducer device 320 for performing the methods described herein.

In some implementations, the transducer device 320 includes multiple channels (not shown) to measure multiple samples 302 simultaneously. In some such implementations, each channel of the transducer device 320 includes an additional pushing transducer 325 and tracking transducer 327 positioned similarly to the single channel configuration. As such, the transducer device 320 increases the overall throughput of the system and measures multiple samples simultaneously or in rapid succession. In further implementations, the sample 302 is placed directly on a contact of the transducer device 320 and does not have the well plate 310 between the transducer device 320 and the sample 302. In further implementations, the transducer device 320 is submerged in a water bath (not shown), and the wells 315 are mounted at the water surface such that the well plates 310 are consistently in contact with the water.

The transducer device 320 is communicatively coupled to one or more processors 330 for performing the methods described herein. The processor 330 may include a controller 335 for controlling the transducer device 320 and/or the translation stage, and a memory 338 for storing machine readable instructions that, when executed, cause the system 300 to perform the methods described herein. In some examples, the processor 330 may be a processing device and may further include one or more input/output devices (e.g., a keyboard, mouse, touchscreen display, etc.), communications modules (e.g., network communications, Wi-Fi, Bluetooth, etc.), and other elements for performing the methods herein.

Figure 2B:
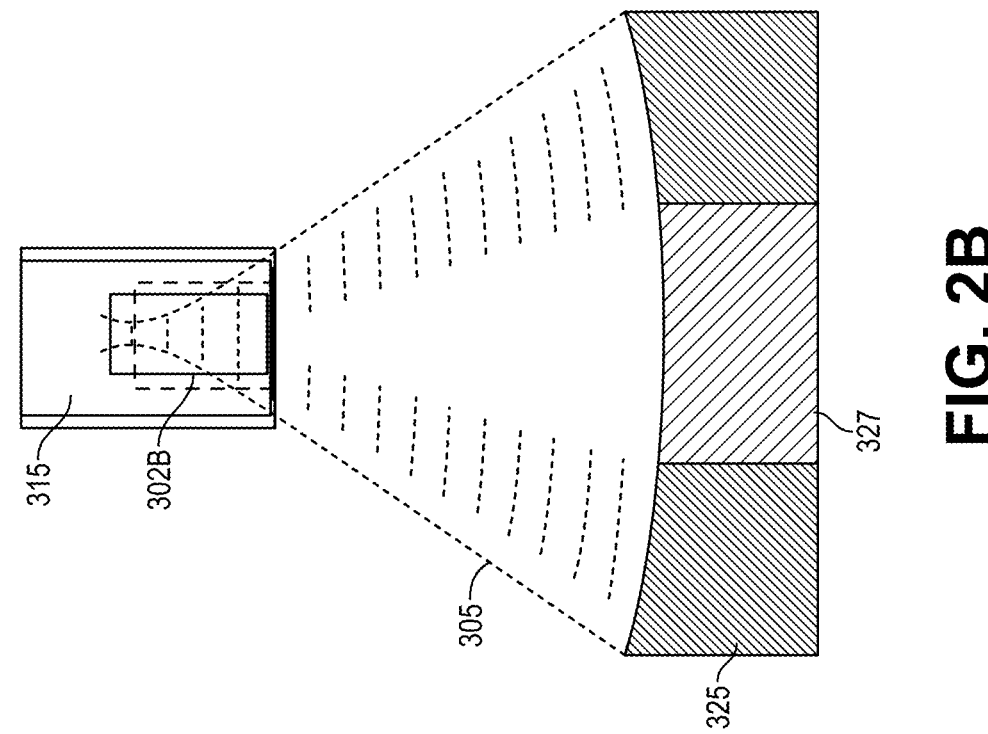
FIG. 2B is a side view of a well from FIG. 1 illustrating a pushing transducer of the dual transducers providing pushing pulses to the sample material the well, in accordance with an example.
Figure 2A:
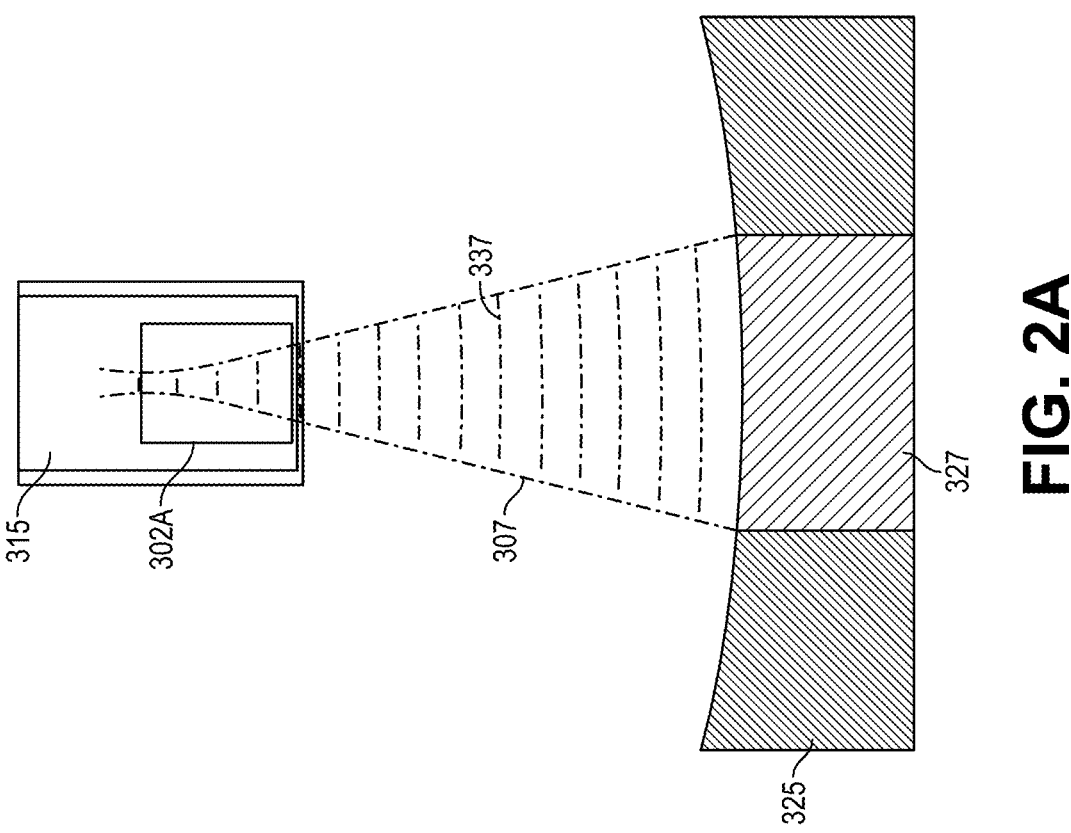
FIG. 2A is a side view of a well from FIG. 1 illustrating a tracking transducer of the dual transducers providing tracking pulses to a sample material in the well, in accordance with an example.
Figure 2C:
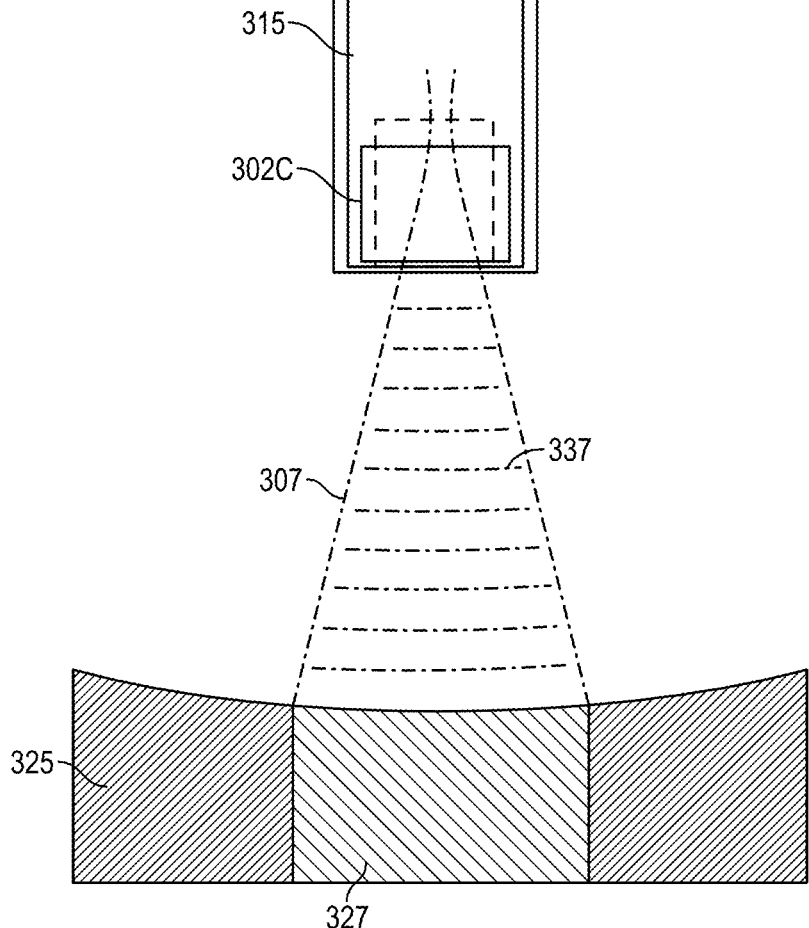
FIG. 2C is a side view of a well from FIG. 1 illustrating the tracking transducer providing tracking acoustic pulses to the well while in a pulse echo mode, in accordance with an example.

FIGS. 2A-2C are side views of wells 315 respectively illustrating the transducer providing tracking pulses 307, excitation pulses 305, and additional tracking pulses 307. In particular, FIG. 2A depicts an initial tracking pulse 307 provided from a tracking transducer 327 as described with regard to FIG. 1 to measure an initial state of a material 302A. Similarly, FIG. 2B depicts an excitation pulse 305 provided from a pushing transducer 325 as described with regard to FIG. 1 to cause deformation in the material 302B. In particular, the exemplary embodiment of FIG. 2B depicts the material 302B in an elongated or stretched state. FIG. 2C depicts an additional tracking pulse 307 provided from the tracking transducer 327 to measure a subsequent state of the material 302C. The exemplary embodiment of FIG. 2C depicts the material 302C in a compressed state. It will be understood that, although FIGS. 2A-2C depict measurements at the initial and compressed states of the material 302A and 302C, the transducer device may take measurements at any appropriate time, including simultaneously to and/or immediately following providing the excitation pulse 305 to capture the stretched state of the material 302B.

Figure 3:
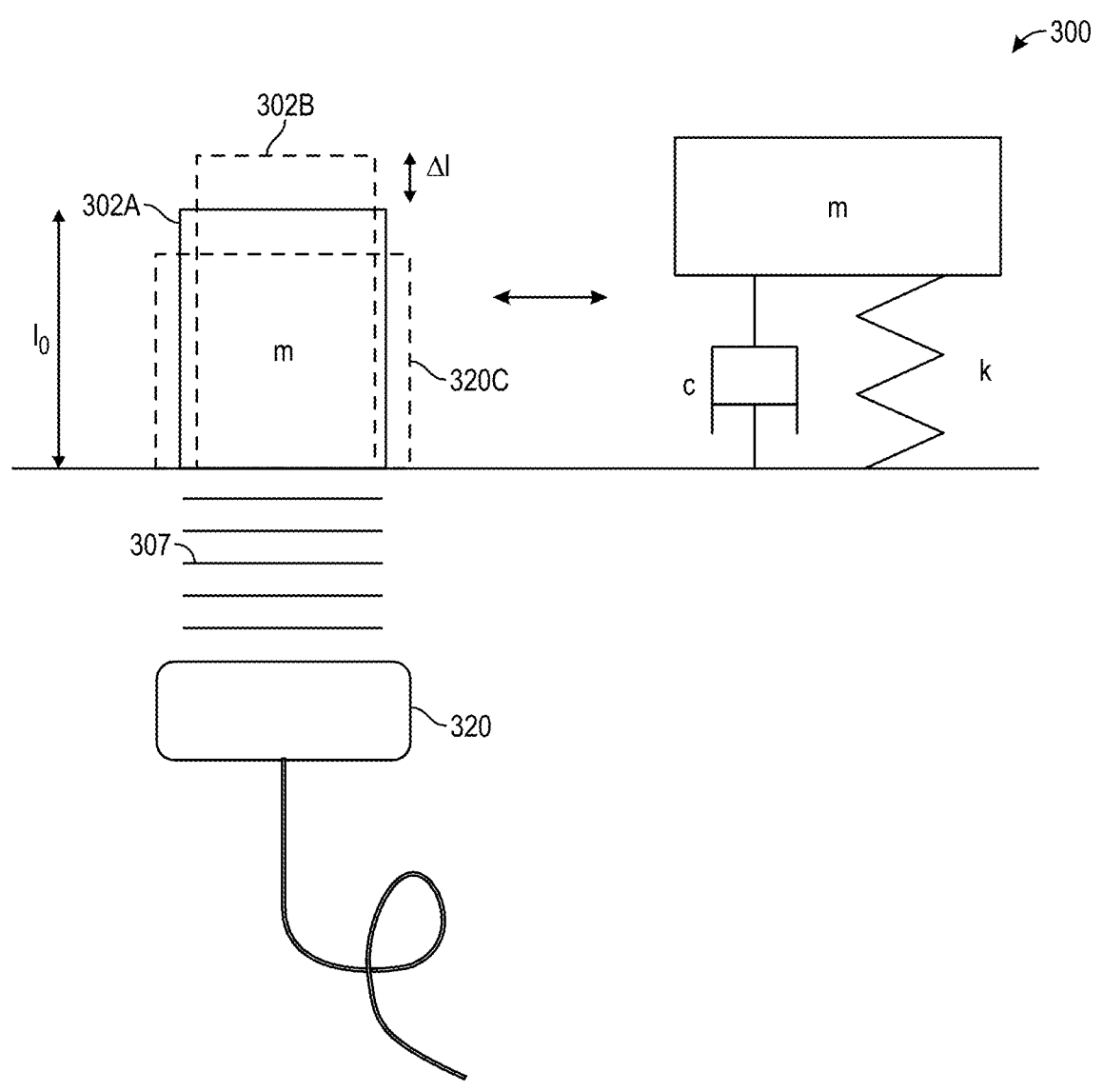
FIG. 3 illustrates a freestanding sample of a material oscillating after the application of excitation pulses and a model depicting a representation of the sample movement, in accordance with an example.

FIG. 3 illustrates a schematic diagram for performing tensile acoustic rheometry on a sample, modeled as a damped harmonic oscillator including a spring, dashpot, and mass. Notably, FIG. 3 illustrates a phenomenon indicative of the overall free oscillatory motion of the sample 302 as well as a model 400 indicative of a mathematical and/or physical representation of the oscillatory motion for the sample. After receiving excitation pulses 305 from the transducer device 320 as described below with regard to FIG. 4, the sample 302 oscillates freely, except for the bottom surface. The excitation pulse 305 may include a sinusoidal tone burst of various powers or durations to cause the deformation of the sample 302. Further, excitation pulse 305 is halted before significant displacement of the sample 302 occurs.

The bottom surface of the sample 302 is affixed to a flat substrate by capillary forces generated by a thin underlying layer of fluid (e.g., water, a physiological solution, etc.) and/or gravity. In the illustrative example of FIG. 3, the sample 302 with an initial height of $l_0$ and a mass m oscillates by approximately $\Delta l$ between the resting state 302A and a stretched state 302B and/or a compressed state 302C along the Y axis. It will be understood that, although FIG. 3 depicts oscillation along the Y axis, other implementations are envisioned. For example, in some implementations the sample 302 oscillates along the X axis, the Z axis, or to a degree along multiple axes. The total strain of the sample material oscillates in a pattern resembling a damping harmonic oscillator described by a Hookean mass-spring system, as illustrated by model 400. The model 400 represents the mass of the sample 302 as m, with the oscillatory motion represented by the spring constant k and the dashpot having a damping coefficient c. The instant techniques allow for the measurement of the tensile oscillation of the sample material by tracking the movement of the sample 302 and the determination of frequency and damping coefficient of the oscillation. In some implementations, the frequency and damping coefficient of the oscillation are independent of the initial acoustic force application by way of excitation pulses 305. Depending on the implementation, the oscillation is also independent of the cross-sectional area and/or shape of the sample 302. As such, the model 400 remains constant even without the need for extensive pre-characterization or sample preparation, improving experimental throughput over conventional mechanical testing. Characteristics of the oscillations of the sample 302 (e.g., maximum amplitude, resonant frequency, damping coefficients, etc.) may be useful for determining material properties of the sample 302, which may further be used for characterization of materials.

In some implementations, because the oscillations of the freestanding sample 302 are modeled as a mass-spring system including a real elastic material with mass distributed evenly along the length, the processors 330 calculate the oscillation frequency as $$\omega = \sqrt{\frac{k}{m}},$$

where k is the spring constant and m is the mass distributed along the length. In further implementations, the processors 330 convert the single parameter spring constant k to a function of elasticity and sample geometry. As such, in such implementations, $$F = \frac{EA}{L_0} * \Delta L = k\Delta L,$$

where F is the net force acting on a surface, E is the Young's modulus, $L_0$ is the total thickness of the material of the sample 302, and A is the cross-sectional area of the sample 302. In such implementations, then, $$k = \frac{EA}{L_0}.$$

Because $$m = \rho V = \rho A L_0, \; \omega = \sqrt{\frac{3k}{m}} = \sqrt{\frac{3\left(\frac{EA}{L_0}\right)}{\rho A L_0}} = \frac{1}{L_0}\sqrt{\frac{3E}{\rho}},$$

with $\rho$ as the density of the sample 302.

In such implementations, because the cross-sectional area cancels out, the tensile oscillation frequency is independent of the cross section of the sample 302. Further, the oscillation frequency has a reciprocal relationship with the thickness of the sample 302. In further implementations, because the techniques herein measure the oscillation frequency, the processor 330 can calculate the Young's modulus for a material with a known density. In further implementations, the processor 330 uses a modified model to include the effects of viscosity (through damping coefficient c in FIG. 3) to model the oscillation as a damped harmonic oscillator.

FIG. 4 is a flow diagram of a method 500 for performing tensile acoustic rheometry on a sample. The method 500 may be performed by the system 300 of FIG. 1. For clarity, the method 500 will now be described with reference to FIGS. 1-3.

Initially, the transducer device 320 is positioned to provide acoustic energy in the form of two different types of pulses to the sample 302 disposed in the well 315 of the well plate 310. The pushing transducer 325 provides one or more excitation pulse 305 (which may be excitation tone bursts) to the sample 302, in particular at an interface of the freestanding sample 302 (block 502), as shown in FIG. 2A. Depending on the implementation, the interface may be a surface of the sample 302 and/or a point in the bulk of the sample 302. In some such implementations, the interface is an air-sample interface, which behaves as a near perfect reflector. As such, the ARF generated by reflection at the interface may be greater than that generated by absorption within a material, allowing, in some implementations, for higher localized displacements with lower acoustic intensities. Moreover, in further implementations, the high intensity reflections from the interface may provide a high signal-to-noise ratio (SNR) for tracking displacement. As such, the transducer device 320 may, in some implementations, generate similar tensile stresses in materials with variable acoustic attenuations and reduces the required energy input, thereby reducing the heating in the overall system. The excitation pulse 305 induces a perturbation in the sample 302 and, in response, the sample 302 deforms according to the applied acoustic energy in the form of the excitation pulses 305. The deformation of the sample 302 causes free oscillatory motion in the sample 302, as previously described. As described in more detail above with regard to FIG. 3, the free oscillatory motion resembles and can be modelled as the motion of a mass and a spring. The excitation pulses 305 may be acoustic waves having a frequency of less than 1 MHz, of between 1 and 5 MHz, of between 5 and 10 MHz, of between 1 and 10 MHz, of between 10 and 25 MHz, etc.

The tracking transducer 327 of the transducer device 320 provides, to the sample 302, the tracking pulses 307 as a second set of acoustic pulses (block 504). At least a portion of the tracking pulses 307 reflect off of the oscillating interface of the sample, resulting in reflected echoes 337. The tracking transducer 327 detects the echo pulses and generates an electrical signal indicative of the detected echo pulses 337 (block 506). The tracking pulses may be acoustic waves having a frequency of between 1 and 5 MHz, of between 5 and 10 MHz, of between 1 and 10 MHz, of between 1 and 20 MHz, of between 10 and 25 MHz, etc. In some implementations, the tracking pulses and the excitation pulses may have different frequencies. For example, the excitation pulses 305 may have a frequency of 1.5 MHz while the tracking pulses may have a frequency of 7 MHz. In further implementations, the tracking pulses and the excitation pulses may have the same frequency instead.

The tracking transducer 327 provides the electrical signal indicative of the detected echo pulses to the processor 330 (block 506). The processor 330 then performs signal analysis of the electrical signal indicative of the detected echo pulses and determines characteristics of the echo pulses.

In an implementation of the method 500, the processor 330 determines, based on the signal indicative of the echoes 337, a displacement as a function of time of an interface of the sample 302 over time (block 508). The interface of the sample 302 may be the surface 312 of the sample 302 at a sample/air interface. More generally, the interface of the sample 302 may be at any surface of the sample 302. In some implementations, the interface of the sample 302 is a plane within the material. In further implementations, the interface of the sample 302 is an interface between a first sample and a second sample, made of the same or different materials. The processor 330 determines the displacement of the interface of the sample 302 over a period of time being a sampling period of time that the tracking transducer 327 provides tracking pulses 302, and receives echo 337 from the sample 302. In some examples, the tracking transducer 327 may provide tracking pulses 307 at a rate of between 1 and 20 kHz to provide a sampling rate of the displacement of the sample 302 of between 1 and 20 kHz.

In some examples, the processor 330 may determine the time dependent displacement from a plurality of displacements of the interface of the sample 302, with each displacement at a different point in time of the sampling period. The displacement of the interface of the sample 302 may be determined with a spatial resolution along the Z-axis of 1 μm, 2 μm, 5 μm, between 0.5 and 1 μm, between 0.5 and 2 μm, or between 1 and 10 μm. The displacement of the interface of the sample may further be determined with an axial resolution, along the X and/or Y axes, of 0.5 μm, 1 μm, 2 μm, 5 μm, between 0.5 and 1 μm, between 0.5 and 2 μm, or between 1 and 10 μm. The processor 330 may determine a frequency spectrum of the free oscillatory motion of the interface of the sample 302 from the time dependent displacement of the interface. Depending on the implementation, the oscillatory motion may be determined to follow a damped, underdamped, overdamped, harmonic or standing wave oscillatory model, and the model as described above with regard to FIG. 3 may be adjusted accordingly. In some implementations, the processor 330 calculates the displacements of the sample 302 from recorded echoes using a normalized cross-correlation. In further implementations, the processor 330 determines the damping and frequency by fitting the peaks of a Fast Fourier Transform (FFT) of the displacement time series and subsequently calculates the parameters and viscoelastic material properties therefrom.

The processor 330 may determine from the displacement as a function of time of the interface of the sample 302 one or more parameters of materials of the sample 302 (block 510). For example, the processor 330 may determine one or more parameters of materials of the sample 302 including a maximum displacement amplitude, natural frequency, and/ or damping coefficient of the freestanding sample 302. The processor 330 then may determine the viscoelastic properties based on a mathematical model that relates the one or more viscoelastic properties of the freestanding sample with the one or more parameters of the sample 302, such as the model described below with regard to FIG. 4 (block 512). Depending on the implementation, the viscoelastic properties of the sample 302 includes at least one of: (i) natural frequencies, (ii) maximum strains, (iii) an elastic modulus, (iv) a shear modulus, (v) a Young's modulus, (vi) a kinematic viscosity, (vii) a shear viscosity, (viii) an interface energy, and/or (ix) damping coefficients corresponding to various modes of oscillation.

The method 500 of FIG. 4 may be performed once to determine the viscoelastic properties of a material over a short sampling period (e.g., seconds, or minutes), or the method 500 may be performed a plurality of times for measuring or monitoring the viscoelastic properties of materials or samples over a longer period of time. Monitoring a sample over longer periods of time allows for the observation of dynamic properties of a material such as changes in elasticity or viscosity, properties which may be useful for determining chemical or physical changes to the microstructure of a sample.

To perform analysis of dynamic properties of the sample 302, the excitation transducer 325 may provide repeated excitation pulses 305 to generate oscillations of an interface (e.g., the surface 312) of the sample 302. The excitation pulse may include a series of sinusoidal tone bursts having a same frequency, or different frequencies to elicit different responses from a material of the sample 302. The tracking transducer 327 may provide tracking pulses 307 during periods when the excitation pulse is applied, and periods after the excitation pulse, or pulses, have been applied, or periods both before and after excitation pulses have been applied. The tracking transducer 327 detects echoes in response to any of these conditions.

In some examples, the processor 330 determines a change in the dynamic viscoelastic properties of the material over time. From these changes, the processor may determine one or more of properties such as the kinetics of a gelation, crosslinking of polymer chains, proteolytic degradation, etc. Further, these and other dynamic viscoelastic properties may be useful for determining a response of the sample 302 to externally applied stimuli such as an applied acoustic energy, electromagnetic energy, heat energy, or other applied energy or force. The processor 330 may determine, from the dynamic viscoelastic properties, a transition of one or more physical properties of the material including the material phase from solid to semisolid or semisolid to solid.

The method 500 may be performed a plurality of times to determine phase changes of a material of the sample 302. For example, the processor 330 may determine a spectrogram or dynamic phase diagram of the material of the sample from one or more dynamic viscoelastic properties.

The processor 330 may further determine a position of the sample 302 relative to the transducer device 320 from the signal provided by the tracking transducer 327. For example, the tracking transducer 327 may provide the tracking pulses 307, detect the echoes 337, and provide the signal indicative of the echoes 337 to the processor 330. The controller 335 may then control the translation stage 332 to reposition the transducer device 320 at a position relative to the sample 302 that is at a focal distance of the transducer, toward a transverse center (X and Y axis) of the sample, or another position as determined by the processor 330.

Figure 5A:
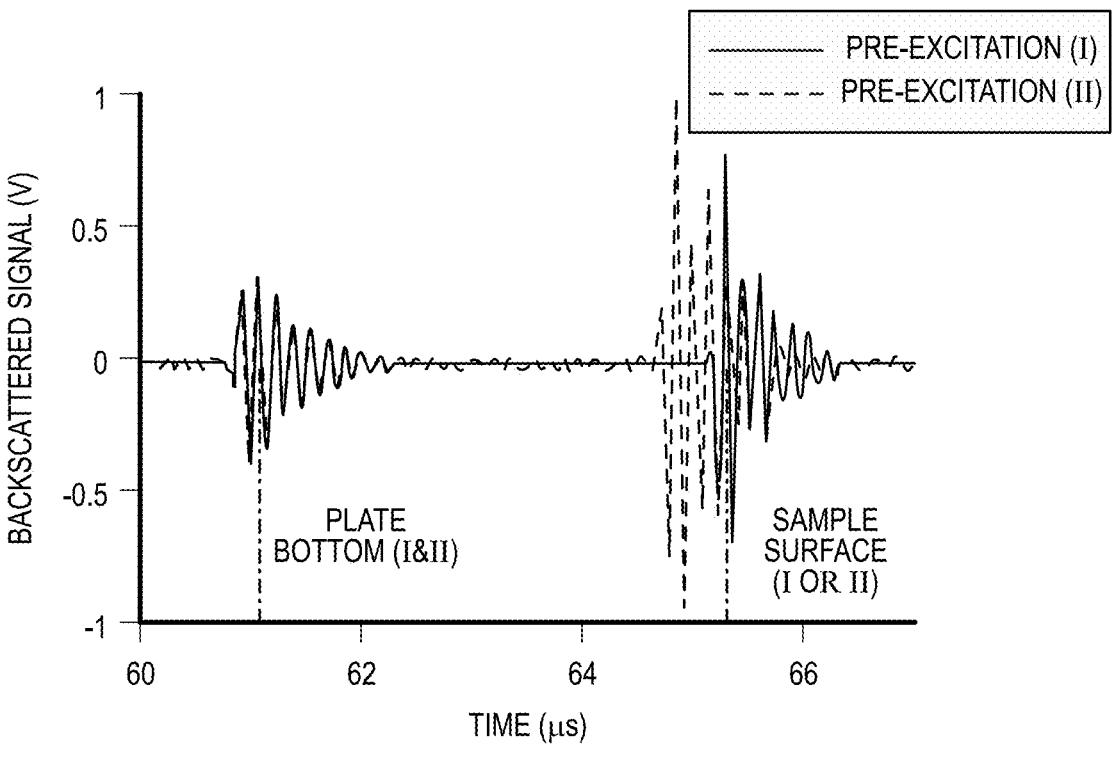
FIG. 5A is a plot of the echoes collected by a tracking transducer used for estimation of displacement and for determining one or more viscoelastic properties, in accordance with an example.

FIG. 5A is a plot of the acoustic echoes reflected off the surface 312 of the sample 302 due to the application of the tracking pulses 307, with an echo detected before and an echo detected after the application of the excitation pulse 305. The time shift in the collected echoes is used to determine the displacement of the sample 302 at the time of the tracking pulse 307.

Figure 5B:
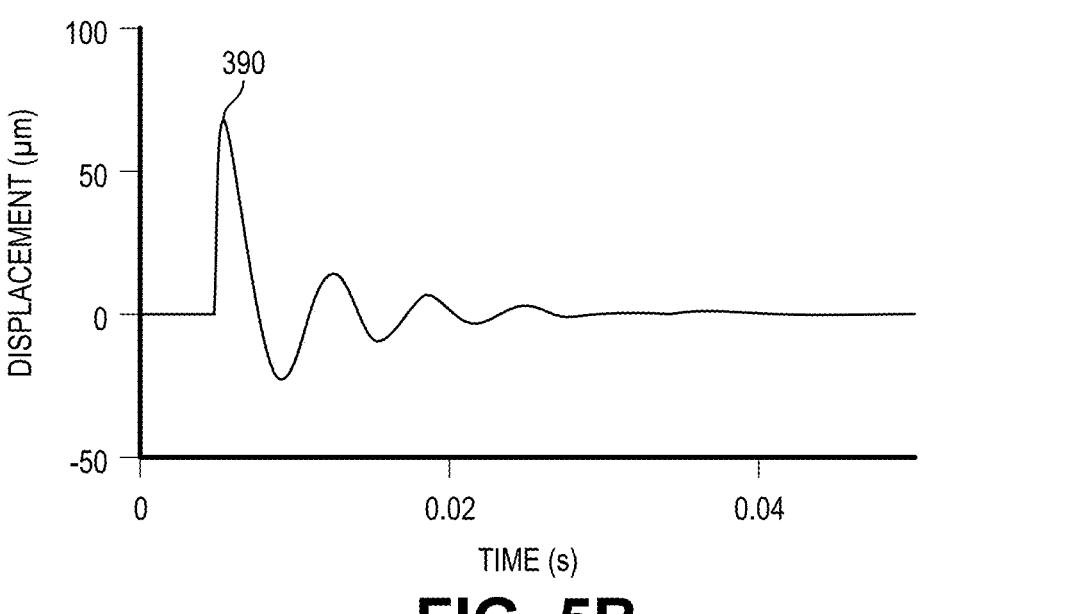
FIG. 5B is a plot of the displacement profile of a material interface over time as measured by the system of FIG. 1, in accordance with an example.

FIG. 5B is a plot of the displacement of the solution surface 312 over time as measured by the system 300 of FIG. 1. The displacement of the solution surface 312 has an initial peak 390, after which the solution surface 312 exhibits a damped harmonic oscillator profile having a resonant frequency, $\omega$, and damping coefficient, $\Gamma$. The resonant frequency and damping coefficient may be used to further determine viscoelastic properties or characteristics of materials.

Figure 5C:
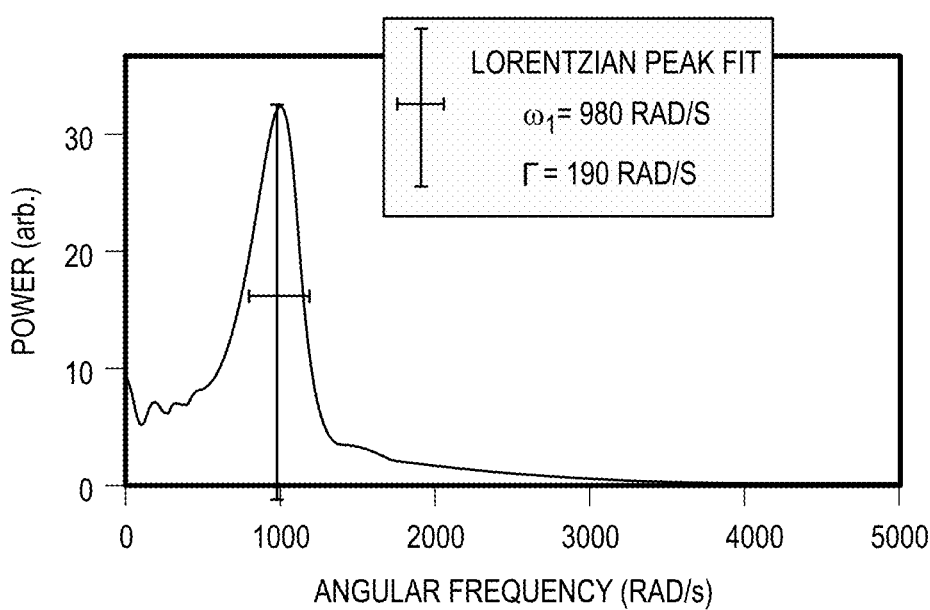
FIG. 5C is a plot of a power spectral density as a function of frequency, which was calculated using a Fourier transform of the time domain data presented in FIG. 5B, in accordance with an example.

FIG. 5C is a plot of the power spectrum taken as the Fourier transform of the time domain data presented in FIG. 5B. The peak shown in FIG. 5C may be modeled using a Lorentzian peak fit with the frequency position and half-width at half-maximum (HWHM) providing the resonant frequency $\omega_0$ and damping coefficient $\Gamma$, respectively. Using models as described herein, at least with regard to FIG. 3, it is therefore possible to calculate the Young's modulus E as $$E = \frac{\omega_0^2 \rho L^2}{3}.$$

Figure 6:
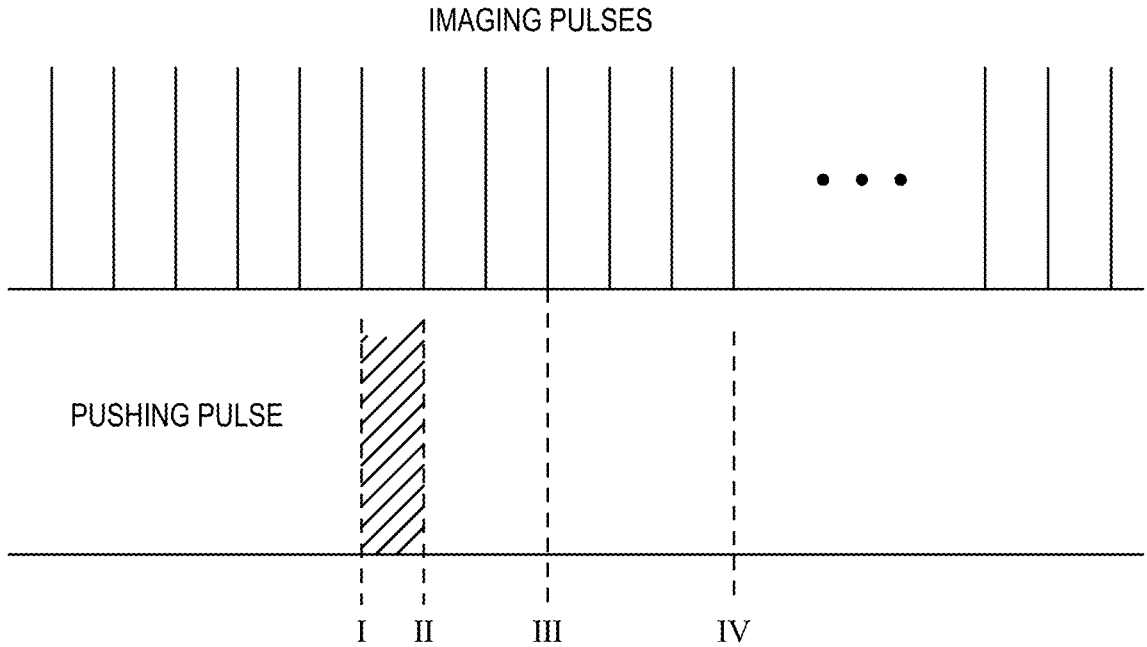
FIG. 6 is a diagram illustrating the application of tracking pulses, with an interspersed pushing pulse to deform the sample, in accordance with an example.

FIG. 6 is a diagram illustrating the application of the excitation and tracking pulses 305 and 307 in accordance with the examples and data provided herein. The tracking transducer 327 provided a series of tracking pulses over a sampling period to continuously measure the displacement of the surface 312 of the sample 302. The pushing transducer 325 provided a single tone-burst pulse to generate the wave causing the oscillation of the sample 302. A portion of the energy provided by the tracking pulses 307 was reflected off of the surface 312 of the sample 302 as an echo 337. The echo pulses 337 were then received by the tracking transducer 327 and further processed and analyzed as described further herein.

Figure 7:
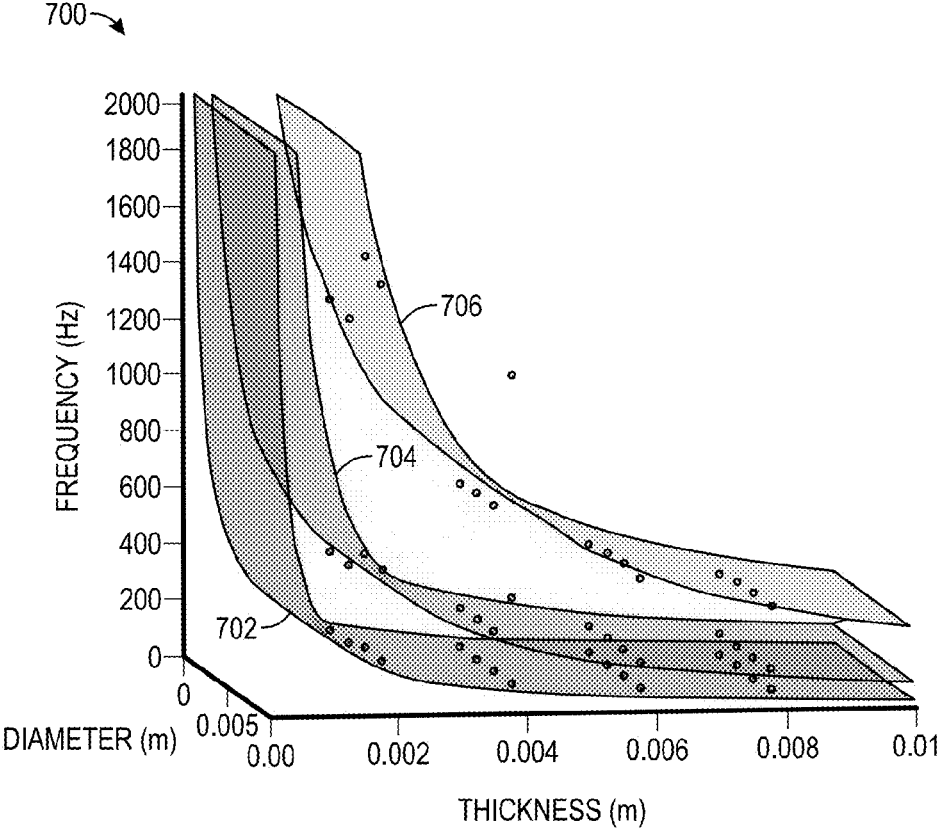
FIG. 7 is a plot of the change of oscillation frequency due to thickness, diameter, and Young's modulus of samples, as measured by the system of FIG. 1, in accordance with an example.
Figure 8:
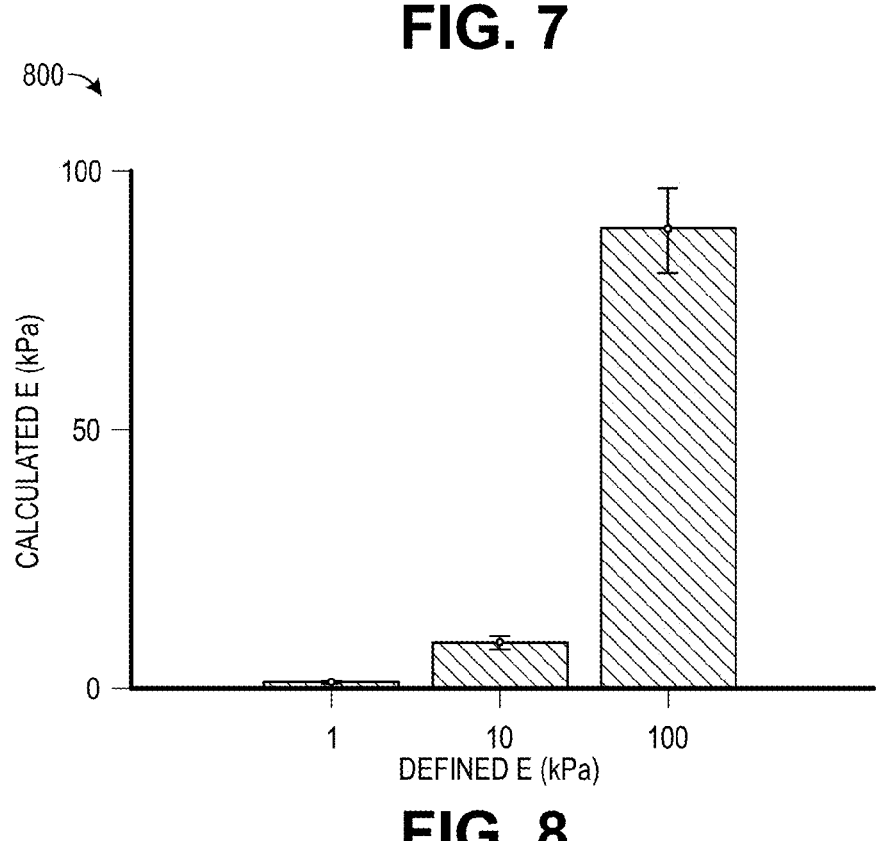
FIG. 8 is a bar graph comparing a defined Young's modulus and calculated Young's modulus according to the data presented in FIG. 7, in accordance with an example.

FIG. 7 is a plot 700 depicting the relationship between the oscillation frequency of the sample 302, the diameter of the sample 302, the thickness of the sample 302, and a defined Young's modulus of the sample 302. FIG. 8 is a bar graph 800 depicting the relationship between the defined Young's modulus of the sample 302 and the calculated Young's modulus for the sample 302 using the techniques for TAR as described herein. The plot 700 and bar graph 800 were generated according to a model of the transient deformations of a free standing viscoelastic cylinder following the application of a temporary boundary load to generate initial tensile stress and strain. In some implementations, the oscillation frequency is independent of the sample diameter, intensity of the excitation pulses 305, and duration of the excitation pulses 305, but varies with a defined Young's modulus of the sample 302 and/or a thickness of the sample 302. The plot 700 depicts such a relationship, with each of 702, 704, and 706 representing a sample with a Young's modulus of 1 kPa, 10 kPa, and 100 kPa, respectively. The plot 700 further illustrates the reciprocal relationship between frequency and thickness, as well as the lack of trend with regard to frequency and diameter.

FIG. 8 depicts a bar graph 800 of the defined Young's modulus of the sample 302 compared to the calculated Young's modulus, including error bars representing a 95% confidence interval (CI) for each measurement. The calculated Young's moduli for the corresponding plots in FIG. 7 702, 704, and 706 are 0.98±0.09 kPa, 9.91±0.9 kPa, and 89.8±7 kPa, respectively.

Figure 9:
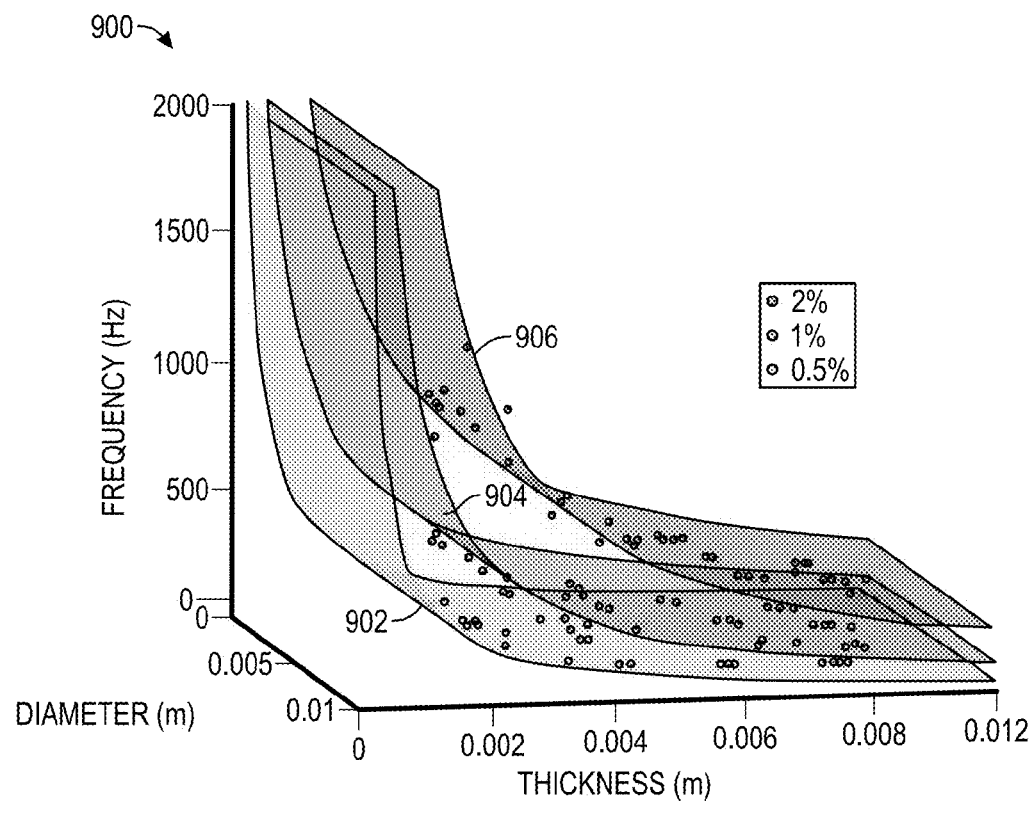
FIG. 9 is a plot of the change of oscillation frequency due to thickness, diameter, and agarose concentration of samples, as measured by the system of FIG. 1, in accordance with an example.
Figure 10:
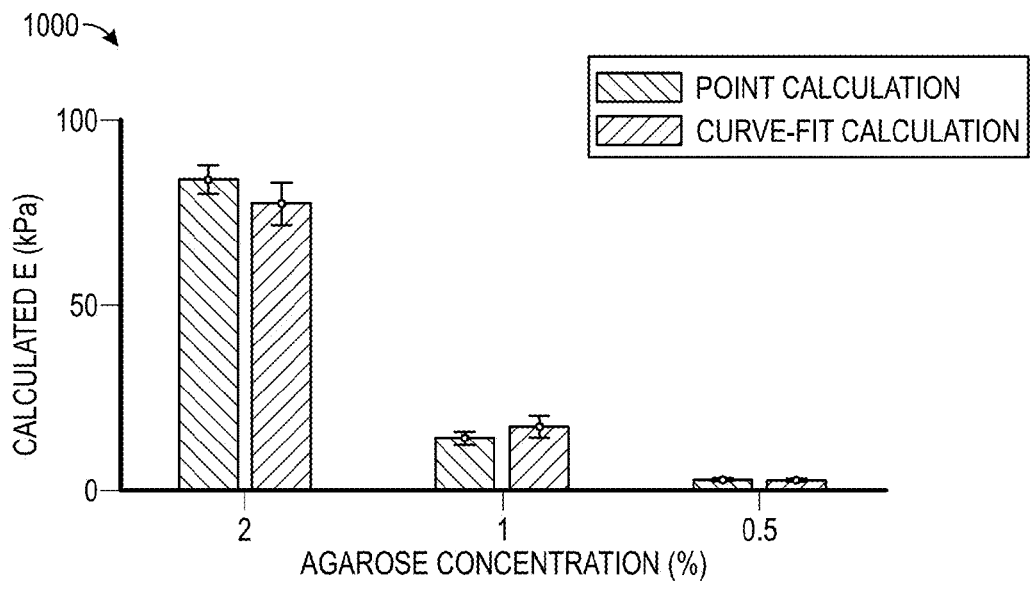
FIG. 10 is a bar graph comparing an agarose concentration of a sample and corresponding calculated Young's modulus according to the data presented in FIG. 9, in accordance with an example.

Similarly, FIGS. 9 and 10 illustrate a plot 900 and bar graph 1000, similar to plot 700 and bar graph 800, depicting (i) the relationship between the oscillation frequency of the sample 302, the diameter of the sample 302, the thickness of the sample 302, and a concentration of a material in the sample 302, and (ii) the relationship between the material concentration of the sample 302 and the calculated Young's modulus for the sample 302 using the techniques for TAR as described herein, respectively. In the illustrative embodiment of FIGS. 9 and 10, the concentration of a material is a concentration of agarose (Type VII), though it will be understood that similar concentrations of material may be measured instead or in addition to agarose. FIG. 10 additionally compares the point calculation to a curve-fit calculation for each agarose concentration.

In the exemplary embodiment of FIGS. 9 and 10, plot 900 and bar graph 1000 were generated using samples 302 in the form of agarose cylinders with diameters of 4, 6, and 8 mm and thicknesses of 2, 4, 6, and 8 mm. The agarose cylinders were fabricated out of 0.5%, 1%, and 2% agarose concentrations, represented by plots 902, 904, and 906, respectively. In the exemplary embodiments of FIGS. 9 and 10, each sample is placed in the center of a well plate well 310 and measured using TAR at ARF pressures of 3 and 4 MPa, and with excitation pulse 305 durations of 33 µs, 66 µs, and 133 µs. In some such implementations, while the change in intensity and/or duration of the excitation pulses 305 impacts the amplitude of the deformation, the oscillation frequency does not change. Similarly, the oscillation frequency does not differ with the diameter of the samples 302. Rather, as shown in plot 900, the oscillation frequency has a reciprocal relationship with the thickness and agarose concentration.

Depending on the implementation, the Young's modulus can be calculated using hyperplanes fitted to the reciprocal relationship of points in plot 900 (e.g., the "point calculation") or by fitting the individual data points to a function $$E = \frac{\rho(\omega L_0)^2}{3}$$

(e.g., the "curve-fit calculation"). In the exemplary embodiment of FIG. 10, the calculated Young's moduli for the 0.5%, 1%, and 2% concentrations are 2.60±0.17 kPa, 17.1±2.8 kPa, and 77.8±5.8 kPa, respectively. In some implementations, calculating the Young's moduli using the curve-fit calculation generates similar values. As such, in such implementations, individual measurements at single thicknesses can be used to predict viscoelastic material properties, such as (i) natural frequencies, (ii) maximum strains, (iii) an elastic modulus, (iv) a shear modulus, (v) a Young's modulus, (vi) a kinematic viscosity, (vii) a shear viscosity, (viii) an interface energy, and/or (ix) damping coefficients corresponding to various modes of oscillation.

Figure 11:
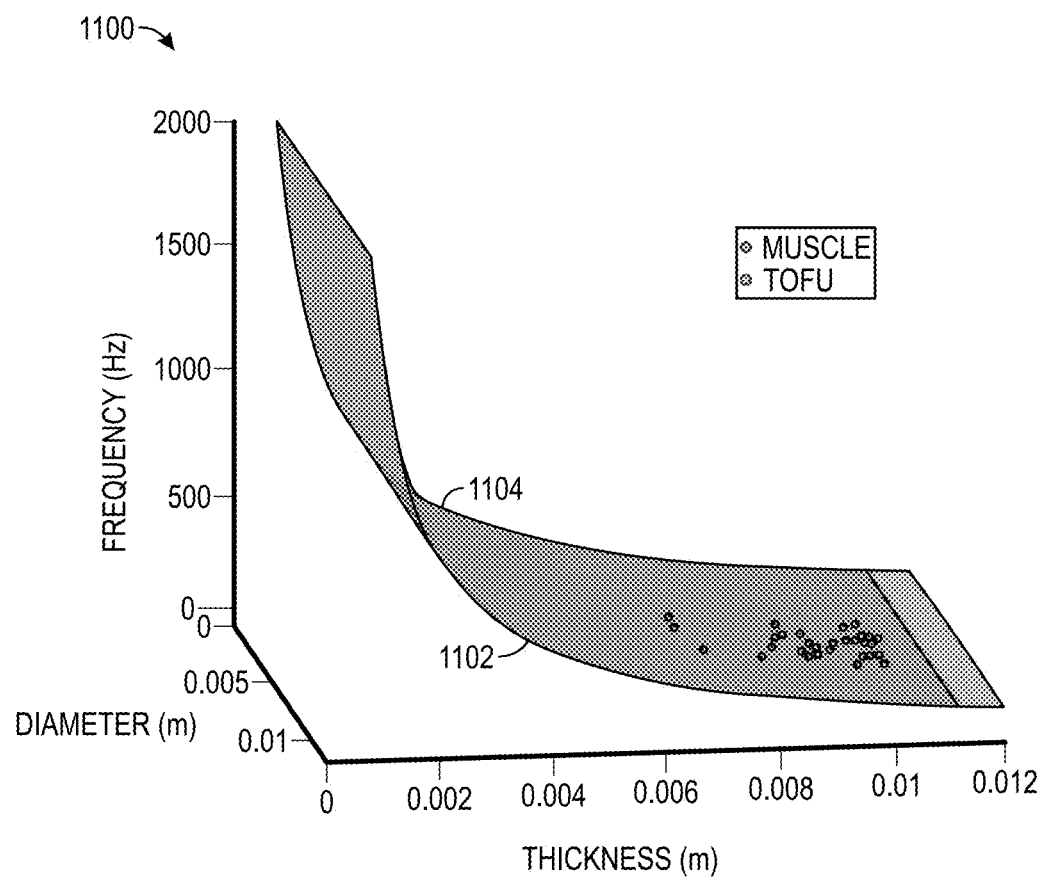
FIG. 11 is a plot of the change of oscillation frequency due to thickness and diameter, for samples made of muscle and tofu, as measured by the system of FIG. 1, in accordance with an example.
Figure 12:
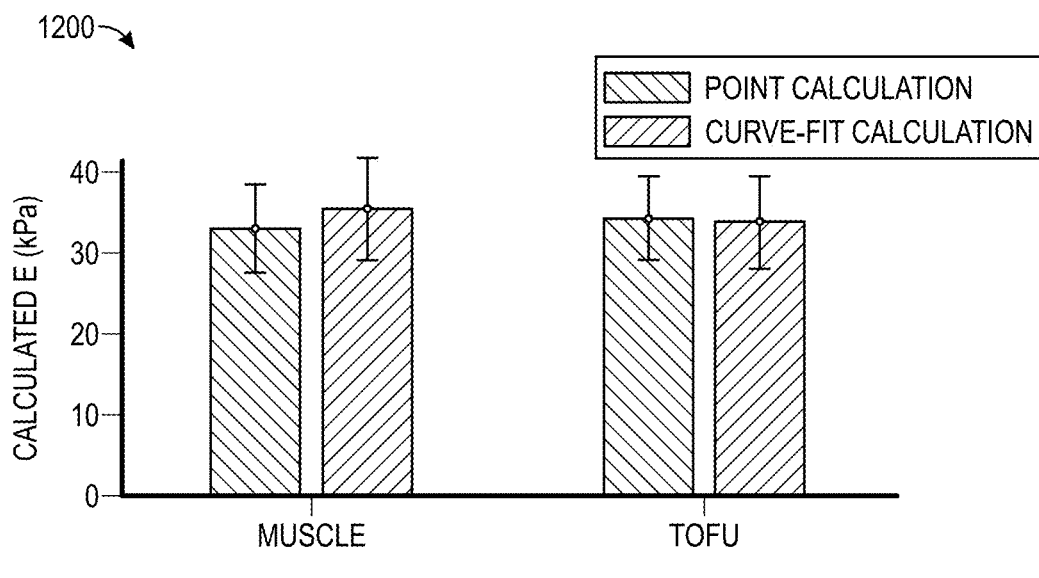
FIG. 12 is a bar graph comparing calculated Young's moduli for samples made of muscle and tofu according to the data presented in FIG. 11, in accordance with an example.

Similarly, FIGS. 11 and 12 illustrate a plot 1100 and bar graph 1200, similar to plots 700 and 900 as well as bar graphs 800 and 1000, depicting (i) the relationship between the frequency of the excitation pulses 305, the diameter of the sample 302, the thickness of the sample 302, and a type of a material in the sample 302, and (ii) the relationship between the material of the sample 302 and the calculated Young's modulus for the sample 302 using the techniques for TAR as described herein, respectively. In the illustrative embodiment of FIGS. 11 and 12, the materials are muscle and tofu, though it will be understood that similar materials may be measured instead of or in addition to muscle and/or tofu. FIG. 12 additionally compares the point calculation to a curve-fit calculation for each material.

In the exemplary embodiment of FIGS. 11 and 12, plot 1100 and bar graph 1200 were generated using samples 302 in the form of cylindrical biopsies of muscle tissue and tofu, with diameters of 6 and 8 mm and thicknesses in the range of 8-12 mm. In the exemplary implementation of FIGS. 11 and 12, the samples 302 are bovine muscle tissue prepared in orientations transverse and longitudinal to muscle fibers and extra firm tofu, represented by plots 1104 and 1102, respectively. However, it will be understood that additional types and/or preparation styles of muscle tissue and tofu may be used. In the exemplary embodiments of FIGS. 11 and 12, each sample is placed in the center of a well plate well 310 and measured using TAR at ARF pressures of 3 and 4 MPa, and with excitation pulse 305 durations of 33 µs, 66 µs, and 133 µs. In some such implementations, while the change in intensity and/or duration of the excitation pulses 305 impacts the amplitude of the deformation, the oscillation frequency does not change. Similarly, the oscillation frequency does not differ with the diameter of the samples 302. Rather, as shown in plot 1100, the oscillation frequency has a reciprocal relationship with the thickness of the material.

In the exemplary embodiment of FIG. 12, the bar graph 1200 illustrates that the calculated Young's moduli for the muscle and tofu are 35.3±6.3 kPa and 33.7±5.6 kPa, respectively. In some implementations, calculating the Young's moduli using the curve-fit calculation generates similar values. As such, the techniques described herein are able to measure materials with stiffnesses similar to the entire range of soft tissues in the human body, as well as many components and products of the cosmetics, food, and agriculture industries. Further, the techniques described herein function successfully on materials that have geometric imperfections and mechanical heterogeneity.

Figure 13A:
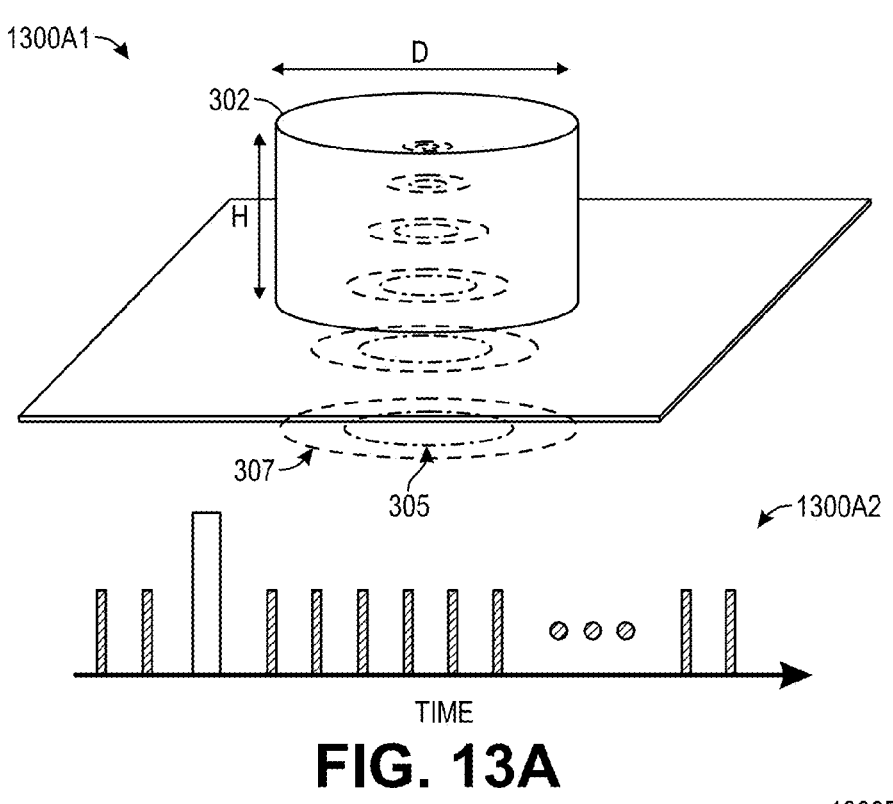
FIG. 13A illustrates a schematic of an example system for characterizing viscoelastic properties of a sample material via tensile acoustic rheometry and a diagram illustrating the application of a tone burst and subsequent pulses to the sample material, in accordance with an example.

FIGS. 13A-13D illustrate an example material undergoing TAR, as well as a series of example plots based on such an example material. In particular, FIG. 13A illustrates a schematic 1300A1 of an example system for characterizing viscoelastic properties of a sample material 302 via tensile acoustic rheometry and a diagram 1300A2 illustrating the application of a tone burst and subsequent pulses to the sample material 302. In the exemplary embodiment of FIG. 13, the material 302 is a cylindrical sample with a diameter of d and a height of h, placed on a flat surface. Further, the sample material 302 receives detection pulses (e.g., tracking pulse 307 of FIGS. 2A-2C) and an activation pulse (e.g., excitation pulse 305 of FIGS. 2A-2C) from a system such as example system 300 described above. Diagram 1300A2 illustrates an example ultrasound application pulse sequence. Although FIG. 13A illustrates a cylindrical sample, it will be understood that the sample material 302 may be any appropriate shape as detailed herein.

Figure 13B:
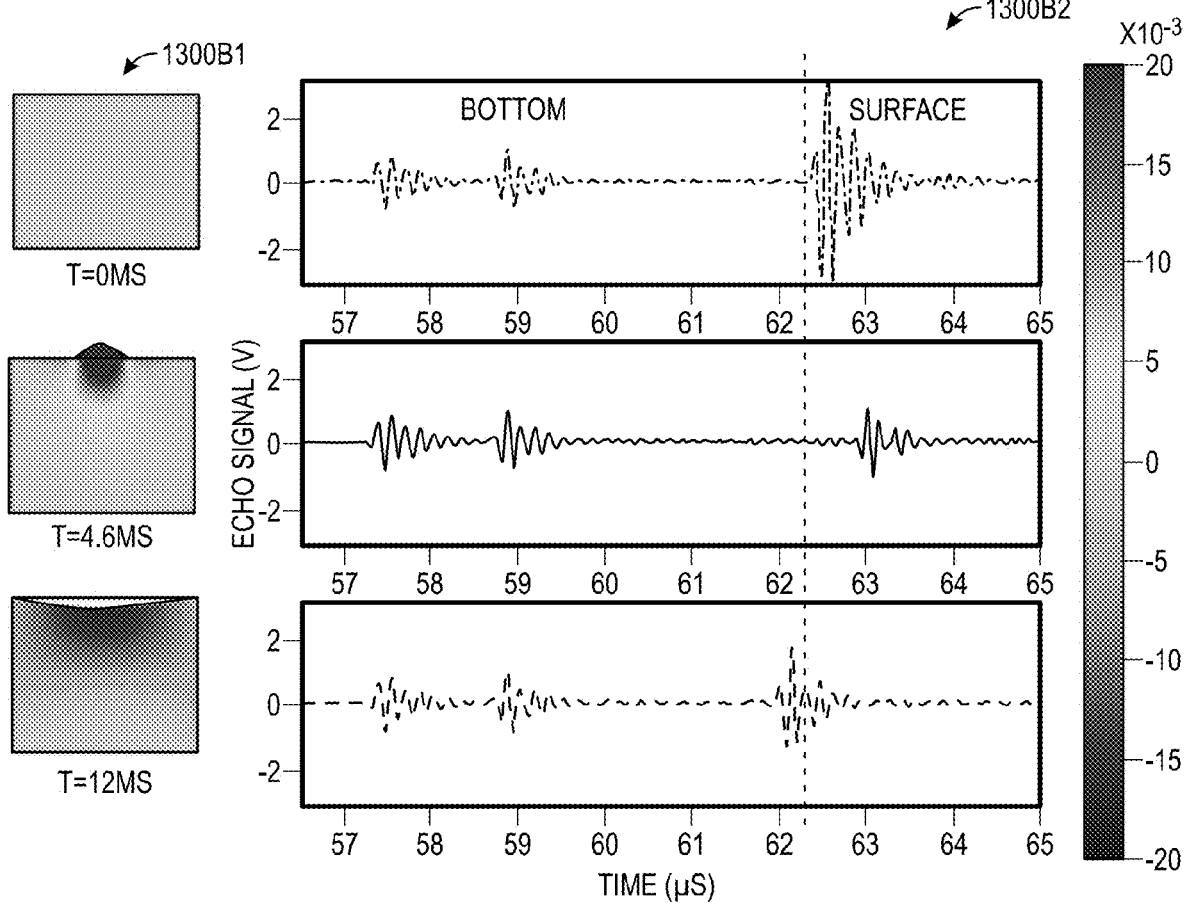
FIG. 13B includes a displacement map and corresponding plots of echo signals at three points in time, as measured by the system of FIG. 13A, in accordance with an example.

FIG. 13B illustrates a displacement map 1300B1 and corresponding plots 1300B2 of echo signals at three points in time using the example of FIG. 13A. In particular, the exemplary embodiment of FIG. 13B includes displacements measured at times 0 ms, 4.6 ms, and 12 ms after beginning the TAR process according to FIG. 13A. Similarly, the plots 1300B2 of the echo signals illustrate the corresponding ultrasound echo signals at each of the different time points after excitation, depicting the locations of the sample surface of the material 302 relative to the bottom of the sample, which remains stationary. It will be understood that, although FIG. 13A illustrates 3 sample measurements, any number of measurements may be performed at any appropriate times.

Figure 13C:
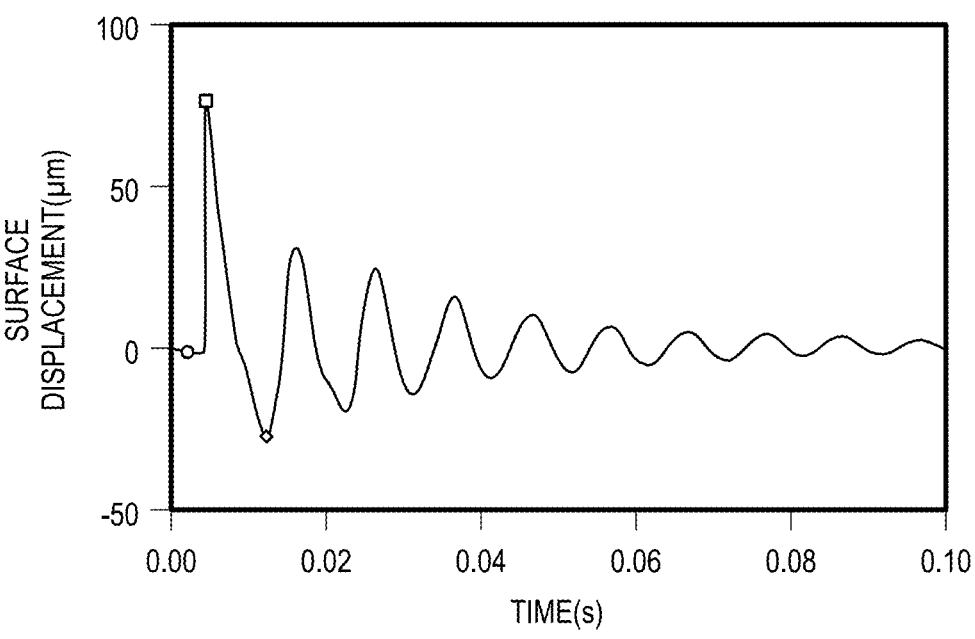
FIG. 13C is a plot of the echoes collected by a tracking transducer used for estimation of displacement and for determining one or more viscoelastic properties, as measured by the system of FIG. 13A, in accordance with an example.
Figure 13D:
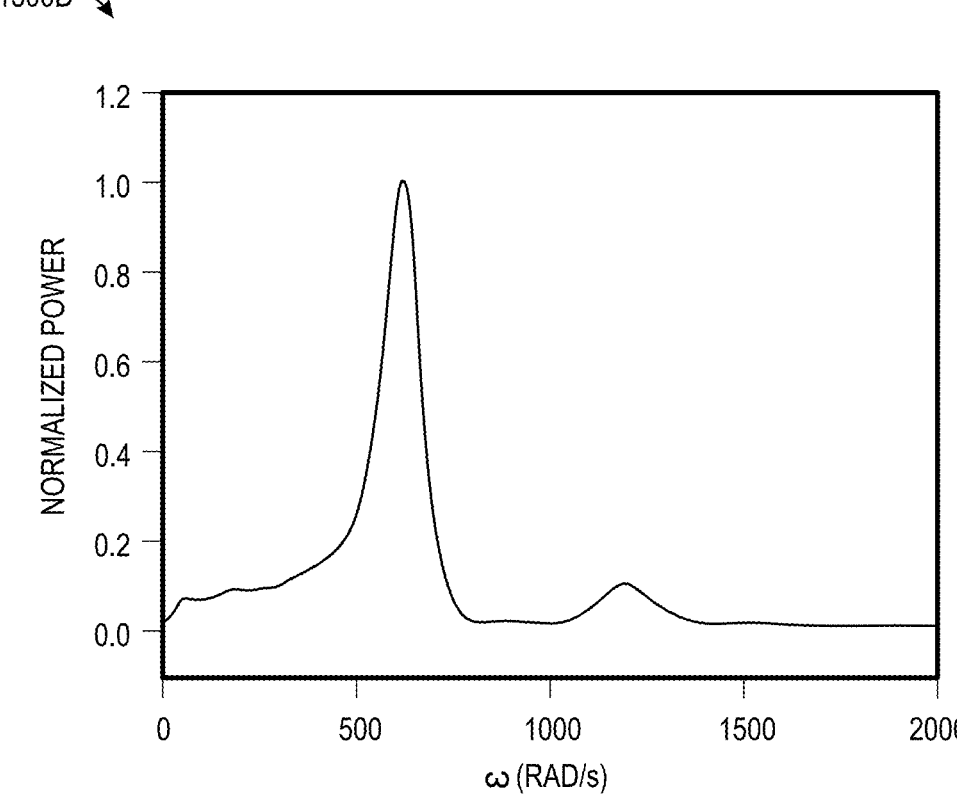
FIG. 13D is a plot of the spectrum of the surface displacement plotted against normalized power of the signal as measured by the system of FIG. 13A, in accordance with an example.

FIGS. 13C and 13D illustrate a plot 13000 of the echoes collected by a tracking transducer used for estimation of displacement and for determining one or more viscoelastic properties and a plot 1300D of the spectrum of the surface displacement plotted against the normalized power of the signal, as measured by the system of FIG. 13A. Plot 13000 also includes 3 measurement points corresponding to the 3 sample points at times of 0 ms, 4.6 ms, and 12 ms as measured in FIG. 13B, corresponding to a starting point, maximum positive displacement, and maximum negative displacement, respectively.

Figure 14A:
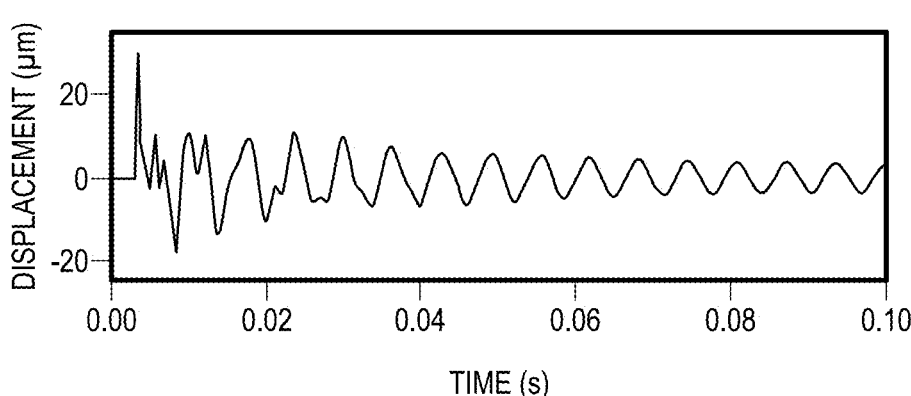
FIG. 14A is a plot of the displacement profile of a material interface over time as measured by the system of FIG. 1, in accordance with an example.
Figure 14B:
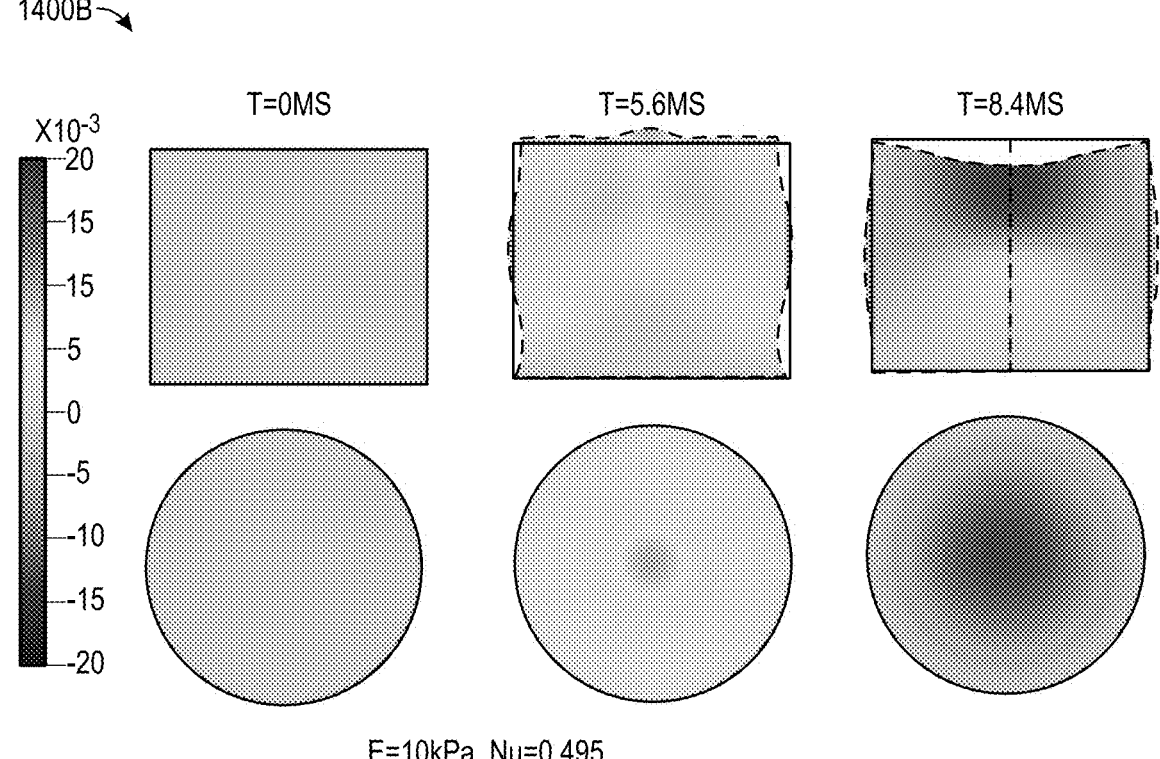
FIG. 14B is a series of images of a displacement map at different times including a side view and a top view of the material, in accordance with an example.
Figure 14C:
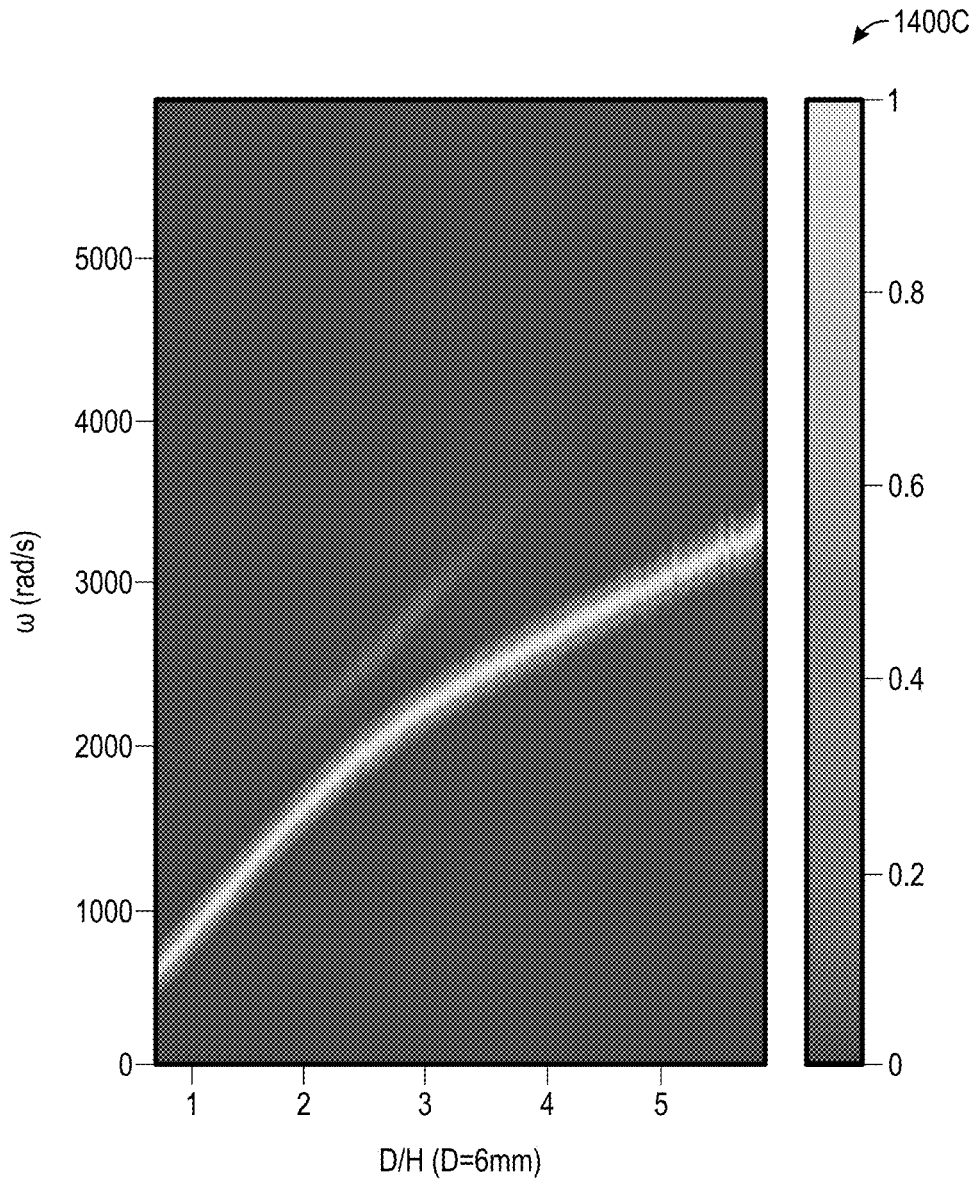
FIG. 14C is a plot of the spectral distribution against the ratio of diameter over height of a sample, in accordance with an example.

FIGS. 14A-14C depict another example simulation of TAR with another cylindrical sample. In particular, FIG. 14A illustrates a plot 1400A depicting a simulated displacement detected at the center of a top surface of a cylindrical sample. Similarly, FIG. 14B illustrates images 1400B corresponding to the plot 1400A at different times (i.e., 0 ms, 5.6 ms, and 8.4 ms after starting TAR) in both side and top views. The exemplary sample in FIG. 14B has viscoelastic properties including at least E=10 kPa and Nu=0.495. FIG. 14C illustrates a plot 14000 of the spectral distribution plotted against the ratio of diameter over height, with a diameter set to 6 mm. In the exemplary embodiment of FIG. 14C, the plot 14000 depicts a deviation from a linear relation for samples with a ratio of $$\frac{d}{h} > 2.5.$$

It will be understood that FIGS. 7-14C are exemplary only and are not intended to limit the instant disclosure to materials with the precise characteristics as described in each of FIGS. 7-14C. As such, it will be understood that any appropriate material as described herein, such as biomaterials, components and products of the cosmetics, food, and agriculture industries, and/or other similarly soft materials may be analyzed using the TAR techniques and devices discussed in the instant disclosure.

The instant techniques and devices discussed herein provide multiple benefits over existing techniques and devices for characterizing materials. The instant techniques are non-contact and non-destructive, reducing contamination and/or damage to the sample being measured. As such, the instant techniques and devices allow for longitudinal tracking over time, where measurements can be repeated at almost any time interval; the instant techniques and devices allow for potential use in quality control and/or tracking; and the instant techniques and devices reduce waste and cost in testing. Further, the instant devices are and/or comprise a low cost assay system. As such, the instant devices do not require specialized cultureware and provide a high sample-throughput. In some implementations, the instant devices read an entire 48 well plate in less than 2 minutes, and longitudinal tracking can be performed on multiple samples simultaneously by using automated transducer placement and/or a multichannel transducer. Moreover, the instant techniques and devices allow for easy sample preparation. In particular, the sample shape and cross sectional area do not affect the oscillatory behavior in the instant techniques, and, as the instant techniques measure thickness automatically, the thickness can always be corrected and does not need to be controlled in preparation. Similarly, the calculation of viscoelastic properties is simpler than existing techniques, and, depending on the implementation, assumptions about the surface tension, oscillation mode, and/or boundary conditions are not needed.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the target matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding; and no unnecessary limitations should be understood therefrom, as modifications within the scope of the invention may be apparent to those having ordinary skill in the art.

What is claimed:

1. A method for performing an acoustic rheology measurement, the method comprising:

providing, by a first ultrasound transducer, an excitation tone burst of short duration to a freestanding sample, the excitation tone burst being focused at an interface of the freestanding sample and inducing a perturbation in the freestanding sample, the perturbation being characterized by an initial deformation or displacement of the interface followed by free oscillatory motion of the freestanding sample;

providing, by a second ultrasound transducer, a plurality of short pulses to the freestanding sample at the interface, the plurality of pulses being synchronized, in time, to impinge upon the interface after the excitation tone burst, to receive, from the interface, echoes responsive to the initial displacement and the following oscillatory motion of the freestanding sample;

detecting, by the second transducer, the echoes and providing electrical signals indicative of the detected echoes to one or more processors;

determining, by the one or more processors, a displacement as a function of time of the interface from the detected echoes;

determining, by the one or more processors, a frequency spectrum of the free oscillatory motion of the freestanding sample from the displacement as a function of time of the interface; and determining, by the one or more processors, one or more viscoelastic properties of the freestanding sample, based on a mathematical model that relates the one or more viscoelastic properties of the freestanding sample with a measured oscillation frequency and a damping of the freestanding sample, which are determined from the displacement as a function of time of the interface.

2. The method of claim 1, wherein the one or more viscoelastic properties are selected from the group consisting of natural frequencies, maximum strains, an elastic modulus, a shear modulus, a Young's modulus, a kinematic viscosity, a shear viscosity, an interface energy, and damping coefficients corresponding to various modes of oscillation.

3. The method of claim 1, wherein determining the displacement as a function of time of the interface of the freestanding sample comprises:

providing a plurality of the excitation tone bursts over a sampling time window;

detecting, by the second transducer, corresponding echoes in response to each of the excitation tone bursts;

determining, by the one or more processors, the displacement as a function of time of the interface over the sampling time window; and determining, by the one or more processors, changes in the one or more viscoelastic properties or the one or more intrinsic properties of the freestanding sample over the sampling time window.

4. The method of claim 3, wherein the plurality of excitation tone bursts are applied periodically.

5. The method of claim 1, wherein determining the displacement as a function of time of the interface of the freestanding sample comprises:

providing a plurality of the excitation tone bursts over a sampling time window;

detecting, by the second transducer, corresponding echoes in response to each of the excitation tone bursts;

determining, by the one or more processors, the displacement as a function of time of the interface over the sampling time window; and determining, by the one or more processors, one or more dynamic viscoelastic properties of the freestanding sample over the sampling time window.

6. The method of claim 5, further comprising:

generating, by the one or more processors, a spectrogram or dynamic phase diagram from the one or more dynamic viscoelastic properties.

7. The method of claim 1, wherein the method is performed independently of a shape of the freestanding sample.

8. The method of claim 1, wherein the method is performed independently of a cross-sectional area of the freestanding sample.

9. The method of claim 1, wherein at least one of the first transducer or the second transducer is a multiple channel transducer and the freestanding sample is a first freestanding sample of a plurality of freestanding samples.

10. The method of claim 1, wherein the freestanding sample comprises one or more of a tissue selected from the group consisting of connective tissue, muscle tissue, epithelial tissue, and nervous tissue.

11. The method of claim 1, wherein the freestanding sample comprises food.

12. The method of claim 1, wherein the freestanding sample comprises one or more cosmetics.

13. The method of claim 1, wherein the first transducer and the second transducer are respectively a first transducer functionality of a combined transducer and a second transducer functionality of the combined transducer.

14. The method of claim 1, wherein the first transducer and the second transducer are located co-axially below the freestanding sample such that the first transducer and the second transducer provide the excitation tone burst and the pulses, respectively, through a bulk region of the freestanding sample, aiming at the interface of the freestanding sample.

15. The method of claim 14, wherein at least one of the first transducer or the second transducer is a contact transducer.

16. The method of claim 1, wherein determining the one or more viscoelastic properties of the freestanding sample based on the mathematical model includes modeling the freestanding sample as a mass-spring system.

17. The method of claim 16, wherein the determining the one or more viscoelastic properties of the freestanding sample or the one or more intrinsic properties of the freestanding sample is according to $$\omega = \frac{1}{L_0}\sqrt{\frac{3E}{\rho}},$$

where $\omega$ is the oscillation frequency of the freestanding sample, E is a Young's modulus, $L_0$ is a total thickness of the freestanding sample, and $\rho$ is a density of the freestanding sample.

18. The method of claim 17, wherein a spring constant k of the freestanding sample modeled as the mass-spring system is $$k = \frac{EA}{L_0},$$

where E is a Young's modulus, $L_0$ is a total thickness of the freestanding sample, and A is a cross-sectional area of the freestanding sample.

19. The method of claim 1, wherein the interface is an upper surface layer of the freestanding sample.

20. The method of claim 1, wherein the interface is an interstitial layer within the freestanding sample.

21. The method of claim 1, wherein excitation ultrasound burst has a duration of at most 100 microseconds.

22. A system for performing an acoustic rheology measurement, the system comprising:

a first transducer aligned to provide an excitation tone burst of short duration to a freestanding sample and to focus the excitation tone burst at an interface of the freestanding sample for inducing a perturbation in the freestanding sample, the perturbation being characterized by an initial deformation or displacement of the interface followed by free oscillatory motion;

a second transducer configured to provide a plurality of pulses to the freestanding sample at the interface, the second transducer further configured to synchronize the plurality of pulses to impinge upon the interface after the excitation tone burst, the second transducer being further configured to detect echoes from the interface and to provide electrical signals indicative of the detected echoes to one or more processors of the system; and a non-transitory computer-readable memory coupled to the one or more processors and storing instructions thereon that, when executed by the one or more processors, cause the one or more processors to:

determine a displacement as a function of time of the interface from the detected echoes; and determine one or more viscoelastic properties of the freestanding sample, based on a mathematical model that relates the one or more viscoelastic properties of the freestanding sample with a measured oscillation frequency and a damping of the freestanding sample, which are determined from the displacement as a function of time of the interface.

* * * * *